(12) United States Patent
Yamamoto et al.

(10) Patent No.: US 11,150,829 B2
(45) Date of Patent: Oct. 19, 2021

(54) STORAGE SYSTEM AND DATA CONTROL METHOD

(71) Applicant: HITACHI, LTD., Tokyo (JP)

(72) Inventors: Takahiro Yamamoto, Tokyo (JP);
Kazuhisa Fujimoto, Tokyo (JP);
Hiroaki Akutsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 86 days.

(21) Appl. No.: 16/594,762

(22) Filed: Oct. 7, 2019

(65) Prior Publication Data

US 2020/0034067 A1 Jan. 30, 2020

Related U.S. Application Data

(63) Continuation of application No. 15/554,537, filed as application No. PCT/JP2015/061165 on Apr. 9, 2015, now Pat. No. 10,452,302.

(51) Int. Cl.
*G06F 3/06* (2006.01)

(52) U.S. Cl.
CPC ............ *G06F 3/0647* (2013.01); *G06F 3/067* (2013.01); *G06F 3/0616* (2013.01); *G06F 3/0649* (2013.01); *G06F 3/0665* (2013.01); *G06F 3/0688* (2013.01)

(58) Field of Classification Search
CPC ...... G06F 3/0647; G06F 3/0649; G06F 3/067; G06F 3/0616; G06F 3/0665; G06F 3/0688
See application file for complete search history.

(56) References Cited

U.S. PATENT DOCUMENTS

| 7,447,832 | B2 | 11/2008 | Kano et al. |
| 8,041,682 | B2 | 10/2011 | Kezuka et al. |
| 9,830,258 | B2 | 11/2017 | Akutsu et al. |
| 2007/0271413 | A1 | 11/2007 | Fujibayashi et al. |
| 2012/0166748 | A1* | 6/2012 | Satoyama ............. G06F 3/0631 711/165 |
| 2012/0221783 | A1* | 8/2012 | Yamamoto .......... G06F 12/0246 711/103 |
| 2013/0205070 | A1* | 8/2013 | Koseki .................. G06F 3/0608 711/103 |
| 2018/0275894 | A1 | 9/2018 | Yoshino et al. |

FOREIGN PATENT DOCUMENTS

| JP | 2013-536478 A | 9/2013 |
| JP | 2015-505078 A | 2/2015 |

\* cited by examiner

*Primary Examiner* — Francisco A Grullon
(74) *Attorney, Agent, or Firm* — Volpe Koenig

(57) ABSTRACT

A storage system and data control method capable of extending the service lifes of storage devices of the same type and with different properties and reducing operation management cost are proposed. The storage system includes: a first storage device; a second storage device with a smaller upper limit number of writes and a larger storage capacity per unit area than those of the first storage device; and a processor that allocates storage areas from the first storage device and the second storage device to a virtual volume to be provided to a host, wherein the processor relocates data which is stored in a storage area with higher write frequency from the host than a predetermined write threshold, from among the storage areas allocated from the second storage device to the virtual volume, from the storage area of the second storage device to a storage area of the first storage device.

6 Claims, 29 Drawing Sheets

FIG.7

Page-Based Monitor Table 501

| | Page Number | 0 | 1 | 2 | 3 |
|---|---|---|---|---|---|
| 701 | Page Number | 0 | 1 | 2 | 3 |
| 702 | Write I/O Counter | 2000 | 12100 | 156 | 56 |
| 703 | Read I/O Counter | 5010 | 6520 | 4600 | 300 |
| 704 | Total I/O Counter | 7010 | 18620 | 4756 | 356 |
| 705 | New Write Flag | 0 | 1 | 1 | 0 |

FIG.8

Parity-Group-Based Monitor Table 502

| | | 0 | 1 | 2 |
|---|---|---|---|---|
| 801 | Parity Group Number | 0 | 1 | 2 |
| 802 | Maximum Write Frequency | 22187 | 1962 | 4703 |
| 803 | Minimum Write Frequency | 5120 | 453 | 1085 |
| 804 | Maximum Read Frequency | 4118 | 8018 | 17862 |
| 805 | Minimum Read Frequency | 950 | 1850 | 4122 |
| 806 | Read/Write Ratio | 16/84 | 80/20 | 79/21 |
| 807 | Possible Write Addition Amount | 0 | 1790 | 2170 |
| 808 | Required Write Reduction Amount | 2447 | 0 | 0 |
| 809 | New Write I/O Counter | 896 | 202 | 69 |
| 810 | New Write Ratio | 16% | 40% | 6% |
| 811 | Average I/O Frequency | 8800 | 12000 | 9000 |
| 812 | Number of Allocated Pages | 458 | 128 | 386 |

FIG.9

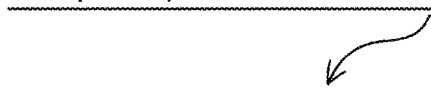

Parity-Group-Based Relocation Management Table 503

| | Parity Group Number | 0 | 1 | 2 |
|---|---|---|---|---|
| 901 | Parity Group Number | 0 | 1 | 2 |
| 902 | Media Type | TLC | TLC | MLC |
| 903 | Migration Source PG Type | Write Reduction PG | Write Addition PG | Write Addition PG |
| 904 | Migration Destination PG | 1 | 0 | 3 |
| 905 | Write Reduction Threshold | 15531 | Invalid | Invalid |
| 906 | Write Addition Threshold | Invalid | 589 | 1411 |
| 907 | Read Reduction Threshold | Invalid | 5613 | 12503 |
| 908 | Read Addition Threshold | 1236 | Invalid | Invalid |
| 909A | Number of Migration-Planned Pages (Write Rebalance) | 156 | 70 | 1486 |
| 910A | Number of Migration-Performed Pages (Write Rebalance) | 154 | 56 | 562 |
| 909B | Number of Migration-Planned Pages (Performance Rebalance) | 84 | 134 | 896 |
| 910B | Number of Migration-Performed Pages (Performance Rebalance) | 0 | 0 | 232 |
| 911 | New Writable Amount | 846 | 1026 | 2394 |

FIG.10

Pool-Based Relocation Management Table504

| | Pool Number | 0 | 1 | 2 |
|---|---|---|---|---|
| 1001 | Pool Number | 0 | 1 | 2 |
| 1002 | Service Life Control Relocation Cycle [hour] | 168 | 24 | 72 |
| 1003 | TLC-MLC Write Threshold | 7040 | 9541 | 4530 |
| 1004 | New Write Threshold | 7550 | 8205 | 4260 |
| 1005 | Workload Type | Write intensive | Unknown | Read intensive |
| 1006 | New Allocation Policy Between Identical Type Drives | Priority on Service Life | Priority on Capacity | Round Robin |
| 1007 | New Allocation Buffer | 3 | 3 | 5 |
| 1008 | Relocation Buffer | 2 | 2 | 3 |

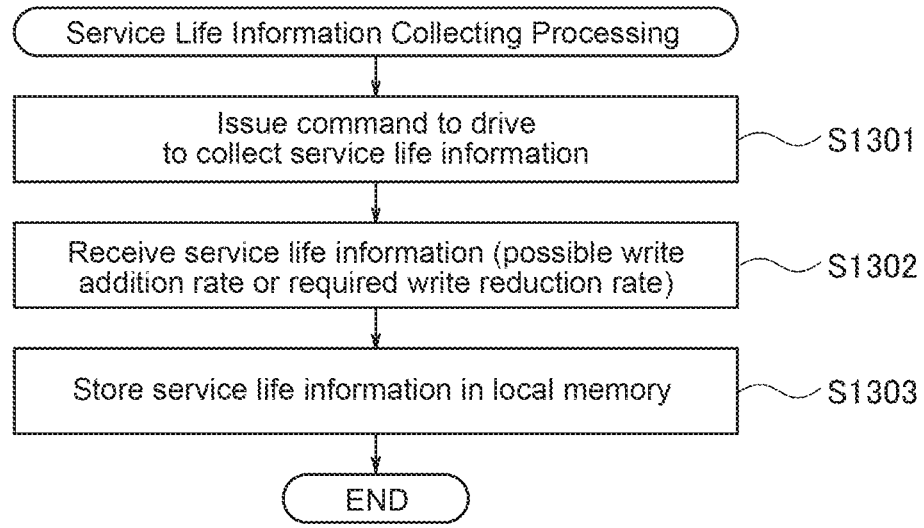
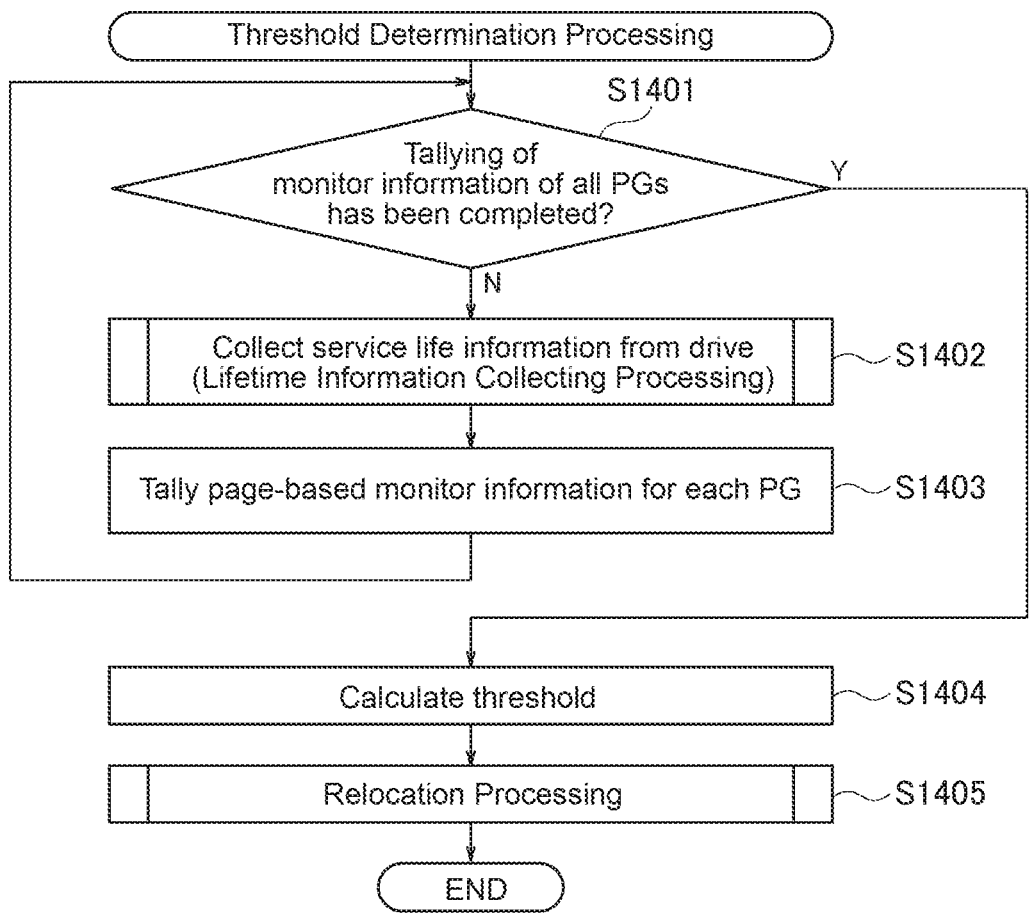

FIG.26

Parity-Group-Based Relocation Management Table503A

| | Parity Group Number | 0 | 1 | 2 |
|---|---|---|---|---|
| 901 | Parity Group Number | 0 | 1 | 2 |
| 902 | Media Type | TLC | SAS | MLC |
| 903 | PG Type | Write Reduction PG | Write Addition PG | Write Addition PG |
| 904 | Migration Destination PG | 1 | – | 3 |
| 905 | Write Reduction Threshold | 15531 | – | – |
| 906 | Write Addition Threshold | – | | |
| 907 | Read Reduction Threshold | – | | |
| 908 | Read Addition Threshold | 1236 | – | – |
| 909 | Number of Migration-Planned Pages (Write Rebalance) | | | |
| 910 | Number of Migration-Performed Pages (Write Rebalance) | | | |
| 911 | Number of Migration-Planned Pages (Performance Rebalance) | | | |
| 912 | Number of Migration-Performed Pages (Performance Rebalance) | | | |
| 913 | New Writable Amount | | | |
| 2601 | Write Demotion Threshold | | | |
| 2602 | Number of Migration-Planned Pages (Write Demotion) | | | |
| 2603 | Number of Migration-Performed Pages (Write Demotion) | | | |
| 2604 | Tier Level | 1 | 2 | 1 |

FIG.27

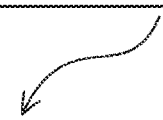

Pool-Based Relocation Management Table504A

| | Pool Number | 0 | 1 | 2 |
|---|---|---|---|---|
| 1001 | Pool Number | 0 | 1 | 2 |
| 1002 | Lifetime Control Relocation Cycle [hour] | 168 | 24 | 72 |
| 1003 | TLC-MLC Write Threshold | 7040 | 9541 | 4530 |
| 1004 | New Write Threshold | 7550 | 8205 | 4260 |
| 1005 | Workload Type | Write intensive | Unknown | Read intensive |
| 1006 | New Allocation Policy Between Identical Type Drives | Priority on Lifetime | Priority on Capacity | Round Robin |
| 1007 | New Allocation Buffer | 3 | 3 | 5 |
| 1008 | Relocation Buffer | 2 | 2 | 3 |
| 2701 | Inter-Tier I/O Threshold | 5680 | 7520 | 2602 |

STORAGE SYSTEM AND DATA CONTROL METHOD

CROSS REFERENCE TO RELATED APPLICATIONS

This application is a continuation of U.S. patent application Ser. No. 15/554,537, filed Aug. 30, 2017, which claims the benefit of PCT/JP2015/061165 filed Apr. 9, 2015 which are incorporated by reference as if fully set forth.

TECHNICAL FIELD

The present invention relates to a storage system and a data control method. Particularly, the invention is suited for use in a storage system and data control method for using a plurality of storage devices of the same type and with different properties and automatically relocating data between the storage devices.

BACKGROUND ART

In recent years, the types of storage devices installed in storage systems have become diversified because of the widespread use of HDDs (Hard Disk Drives) and SSDs (Solid State Drives). Particularly, regarding the SSDs, their data storage methods include SLC (Single Level Cell), 2-bit MLC (Multi Level Cell), or TLC (Triple Level Cell); and they are characterized in that even if they are the storage devices of the same type, they have different service lifes (the upper limit number of writes) and bit costs.

Generally, the service life of SLC is the longest and becomes shorter in the order of MLC and TLC. Moreover, the bit cost of TLC is the lowest and becomes higher in the order of MLC and SLC. Therefore, with a storage system equipped with SSDs, it is important to locate data appropriately in consideration of the properties of the SSDs.

PTL 1 and PTL 2 disclose techniques that manage or control a storage system equipped with a plurality of storage devices. Specifically, PTL 1 discloses a technique that integrally manage a plurality of storage devices as a pool and provides a host system with virtual volumes.

Furthermore, PTL 2 discloses a technique that enhances response performance to a host system by managing HDDs and SSDs as storage devices of different tiers, automatically relocating data according to access frequency from the host system, and enhancing a data hit rate in a high tier.

CITATION LIST

Patent Literature

PTL 1: U.S. Pat. No. 7,447,832
PTL 2: U.S. Pat. No. 8,041,682

SUMMARY OF THE INVENTION

Problems to be Solved by the Invention

However, regarding the techniques described in PTL 1 and PTL 2, when data is written to a storage system in which a plurality of storage devices (such as SSDs) of the same type and with different properties (service lifes and bit costs) are mixed, the data is written to each storage device with no consideration for the properties.

When the data is written to the SSDs with no consideration for their properties, the service life of an SSD whose upper limit number of writes is small expires earlier than an SSD whose upper limit number of writes is large; and the problem is that the number of times the SSDs whose service lifes have expired are replaced increases, thereby increasing operation management cost of the storage system.

The present invention was devised in consideration of the above-described circumstances and proposes a storage system and data control method capable of extending the service lifes of storage devices of the same type and with different properties and reducing the operation management cost.

Means to Solve the Problems

In order to solve the above-described problems, provided according to the present invention is a storage system including: a first storage device; a second storage device with a smaller upper limit number of writes and a larger storage capacity per unit area than those of the first storage device; and a processor that allocates storage areas from the first storage device and the second storage device to a virtual volume to be provided to a host, wherein the processor relocates data which is stored in a storage area with higher write frequency from the host than a predetermined write threshold, from among the storage areas allocated from the second storage device to the virtual volume, to a storage area of the first storage device.

In order to solve the above-described problems, provided according to the present invention is a data control method for a storage system including: a first storage device; a second storage device with a smaller upper limit number of writes and a larger storage capacity per unit area than those of the first storage device; and a processor that allocates storage areas from the first storage device and the second storage device to a virtual volume to be provided to a host, the data control method comprising: a first step executed by the processor relocating data which is stored in a storage area with higher write frequency from the host than a predetermined write threshold, from among the storage areas allocated from the second storage device to the virtual volume, to a storage area of the first storage device; a second step executed by the processor relocating data which is stored in a storage area with write frequency from the host equal to or lower than the write threshold, from among the storage areas allocated from the first storage device to the virtual volume, to a storage area of the second storage device.

Advantageous Effects of the Invention

According to the present invention, the service lifes of the storage devices of the same type and with different properties can be extended and the operation management cost can be reduced.

BRIEF DESCRIPTION OF DRAWINGS

FIG. 7 is a logical configuration diagram of a page-based monitor table;

FIG. 8 is a logical configuration diagram of a parity-group-based monitor table;

FIG. 9 is a logical configuration diagram of a parity-group-based relocation management table;

FIG. 10 is a logical configuration diagram of a pool-based relocation management table;

FIG. 13 is a flowchart of service life information collecting processing;

FIG. 14 is a flowchart of threshold determination processing;

FIG. 26 is a logical configuration diagram of a parity-group-based relocation management table;

FIG. 27 is a logical configuration diagram of a pool-based relocation management table;

DESCRIPTION OF EMBODIMENTS

Figure 1:
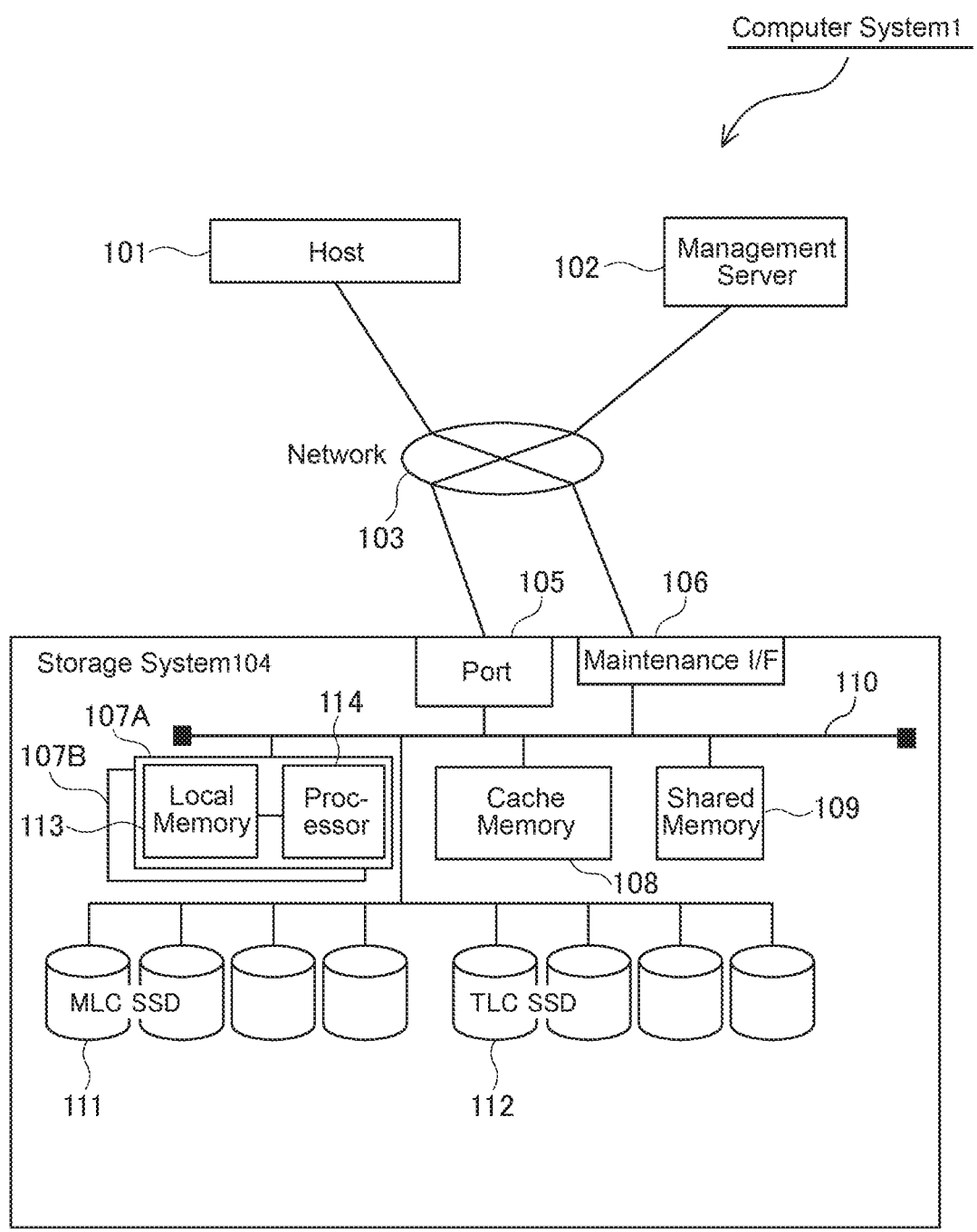
FIG. 1 is an overall configuration diagram of a computer system according to a first embodiment.

An embodiment of the present invention will be explained with reference to the drawings. Incidentally, embodiments described below are an example for implementing the present invention and does not limit the technical scope of the present invention. Moreover, regarding any common component in each drawing will be assigned the same reference numeral and an explanation about it will be omitted. Furthermore, when a plurality of the same elements are illustrated in each drawing, they are distinguished from each other by assigning alphabets like "201A" and "201B"; and they will be collectively referred to as "201" by omitting the alphabets. Furthermore, the embodiments of the present invention may be mounted in software which operates on a general-purpose computer, or in dedicated hardware. Also, the embodiments of the present invention may be mounted in a combination of software and hardware. In the following explanation, information for management will be explained in table formats; however, the information for management do not necessarily have to be expressed in a data structure via tables and may be sometimes simply referred to as "information" with respect to, for example, "lists," "DB," and "queues." Furthermore, each processing in the embodiments of the present invention may sometimes be explained by referring to a "program" as a subject (operation subject). The program executes defined processing as the program is executed by a processor by using a memory and a communication port (communication control unit). So, the processor may be used as a subject for the explanation. Some or all of programs may be implemented in dedicated hardware or may be modularized. Various types of programs may be installed in each computer by means of a program distribution server or storage media.

(1) First Embodiment

With a storage system equipped with only semiconductor memories (SSDs) as storage devices, a first embodiment is designed so as to achieve longer service life of the semiconductor memories and reduce the bit cost by relocating data between the semiconductor memories with different properties (for example, between TLC and MLC). Furthermore, it is intended to implement load balancing and achieve the longer service life by relocating data between the semiconductor memories of the same type (for example, between TLC and TLC).

(1-1) Overall Configuration of Computer System

FIG. 1 illustrates an overall configuration of a computer system 1 according to the first embodiment. The computer system 1 is configured by including a host 101, a management server 102, a network 103, and a storage system 104. The host 101 is, for example, a general server and is connected via the network 103 to a port 105 on the storage system 104. The host 101 executes reading or writing of data by issuing a read request or a write request to the storage system 104.

The network 103 is communication lines such as a SAN (Storage Area Network) or Ethernet (registered trademark). The management server 102 is connected via the network 103 to a maintenance I/F 106 or the port 105 on the storage system 104. A storage administrator sets various necessary settings and management to operate the storage system 104 by operating the management server 102.

Next, an internal configuration of the storage system 104 will be explained. The storage system 104 includes, for example, the port 105, the maintenance I/F 106, processor packages 107, a cache memory 108, a shared memory 109, drives 111, and drives 112. They are connected to each other via an internal network 110 so that they can communicate with each other.

The cache memory 108 is a high-speed accessible memory serving as a temporary cache to store data in order to enhance throughput and responses of I/O processing of the storage system 104. The processor package 107 is configured by including a local memory 113 and a processor 114. Incidentally, regarding the processor packages 107 in this example, two processor packages 107A and 107B are illustrated; however, the number of the processor packages 107 is not limited to this example.

The processor 114 executes processing for transferring data between the drives 111 and 112 and the cache memory 108 in order to process read requests and write requests from the host 101. The shared memory 109 is a memory for storing necessary control information when the processor 114 processes a read request or a write request and executes functions of the storage system 104 (such as a volume copy function). The shared memory 109 stores information which is shared by the processors 114 of the plurality of processor packages 107 (107A and 107B in this example).

The local memory 113 is a memory for storing necessary control information when the processor 114 processes a read request or a write request and executes the functions of the storage system 104. The local memory 113 stores information possessed by each processor 114. The local memory 113 stores, for example, programs which are executed by the processor 114.

The drives 111 and 112 are storage devices composed of a plurality of semiconductor memories (SSD: Solid State Drives). The drive 111 used herein is an MLC SSD (Multi Level Cell SSD) which stores 2-bit information in one cell; and the drive 112 is a TLC (Triple Level Cell SSD) which stores 3-bit information in one cell.

The differences between the MLC SSD and the TLC SSD are that in addition to the information amount per cell which differs between them as described above, the service life (an upper limit number of writes) and the bit cost differ. As the information amount per cell becomes larger, the service life generally becomes shorter. Therefore, the service life of the MLC SSD is longer than that of the TLC SSD. Moreover, the bit cost is kept lower as the information amount per unit area is larger. So, the bit cost of the MLC SSD is higher than that of the TLC SSD.

In other words, it can be said that the MLC SSD has a longer service life and a higher bit cost, while the TLC SSD has a shorter service life and a lower bit cost. Incidentally, in this example, the MLC SSD and the TLC SSD are used to constitute the drives 111 and 112; however, the invention is not limited to this example and SLC SSD (Single Level Cell SSD) may be used.

When emphasis is hereinafter placed on the fact that the drives 111 and 112 are storage devices of the same type and with different properties, the drive 111 will be sometimes referred to as the MLC SSD and the drive 112 will be sometimes referred to as the TLC SSD. Moreover, a parity group composed of a plurality of MLC SSDs will be sometimes referred to as an MLC PG and a parity group composed of a plurality of TLC SSDs will be sometimes referred to as a TLC PG.

(1-2) Logical Configuration of Storage System

Figure 2:
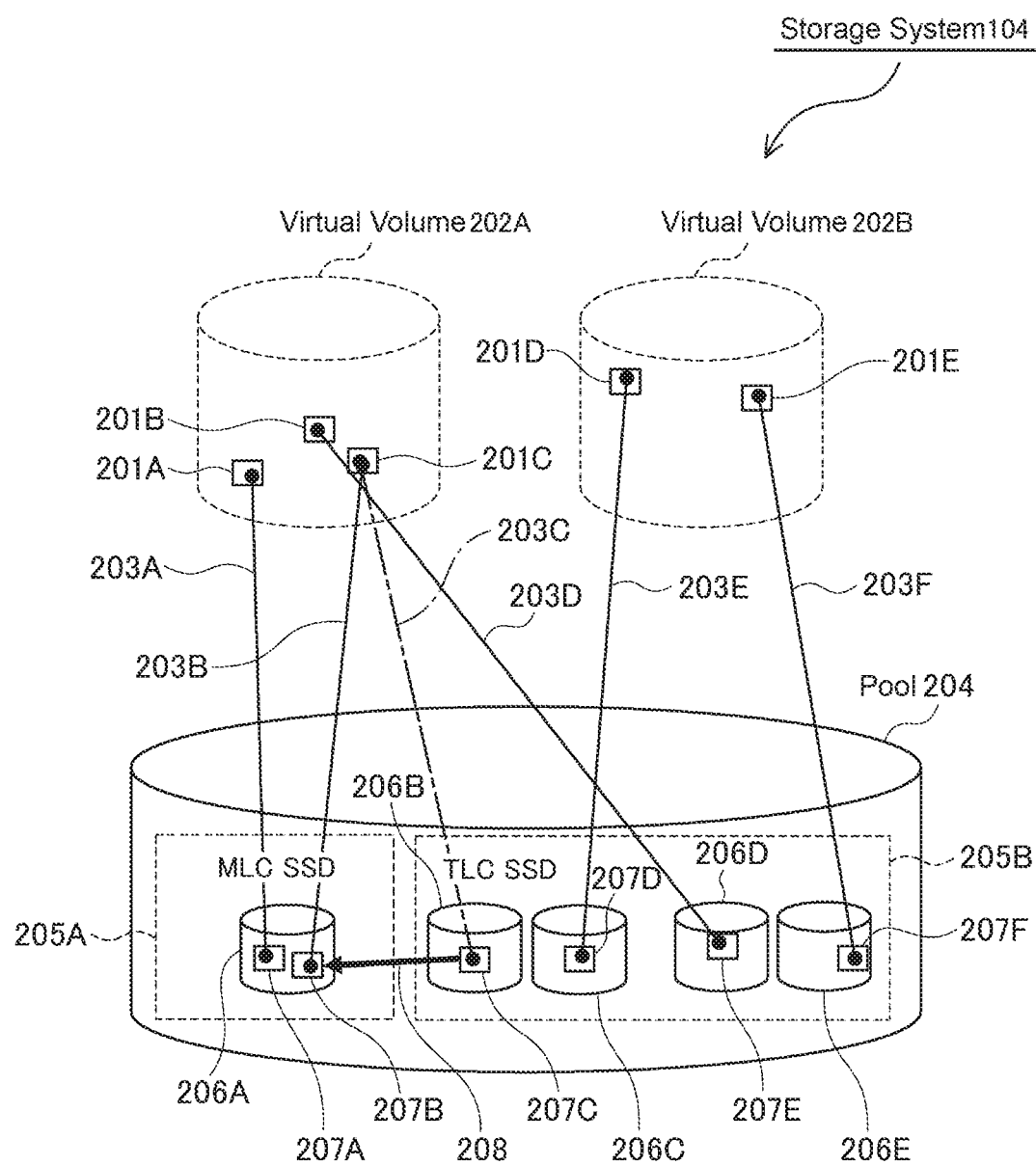
FIG. 2 is a logical configuration diagram of a storage system.

FIG. 2 illustrates a logical configuration of the storage system 104. Virtual volumes 202A and 202B provided by the processor 114 to the host 101 are logical storage areas recognized by the host 101 and are target storage areas to which a read request or a write request is issued from the host 101.

A pool 204 is composed of one or more pool volumes 206A to 206E. Each pool volume 206A to 206E is composed of storage areas of either MLC SSDs or TLC SSDs. One or more pool volumes 206A to 206E form a parity group (PG) 205A or 205B.

Incidentally, the parity group 205A in this example is composed of only the MLC SSDs and the parity group 205B is composed of only the TLC SSDs; however, the invention is not necessarily limited to this example and the MLC SSDs and the TLC SSDs may be mixed to constitute one parity group. Regarding the pool volumes 206, part or whole of the parity group 205 is cut out and used.

For example, when the host 101 issues a write request to the virtual volume 202A, the processor 114 allocates a specified unit (page) of an unused real storage area from the pool 204 to a virtual storage area which is a target of the write request in this virtual volume 202A.

Incidentally, a page is a minimum-unit storage area when writing data. In this example, virtual pages allocated to the virtual volume 202A or 202B are indicated as 201A to 201E; and real pages, which are allocated to these pages 201A to 201E, in the pool volumes 206A to 206E are indicated as 207A to 207F.

When a read request or a write request is issued to the same page 201A from the host 101 next time, the processor 114 can perform processing as if the host 101 were executing I/O processing on the virtual volume 202A, by executing the I/O processing on the storage area 207A of the pool volume 206A which is already allocated.

Specifically speaking, the limited storage capacity can be used efficiently by using the virtual volume 202A or 202B to allocate only portions to be used, that is, the storage areas (pages) 207A to 207F of the pool volumes 206A to 206E.

Under this circumstance, the number of writes per unit time from the host 101 (hereinafter referred to as write frequency) differs with respect to each page 201 which constitutes each virtual volume 202A or 202B. Therefore, for example, the service life of the storage devices whose upper limit number of writes is small like the TLC SSD can be extended by locating, for example, a page 201A with high write frequency to a parity group 205A composed of the MLC SSD whose upper limit number of writes is large as its property.

The above-described relocation is executed specifically by copying data stored in a page 207C to an unused page 207B and changing the association between the page 201C of the virtual volume 202A and the page 207C of the pool volume 206B to the association between the page 201C of the virtual volume 202A and the page 207B of the pool volume 206A.

(1-3) Conceptual Configuration of Page Location Processing

Figure 3:
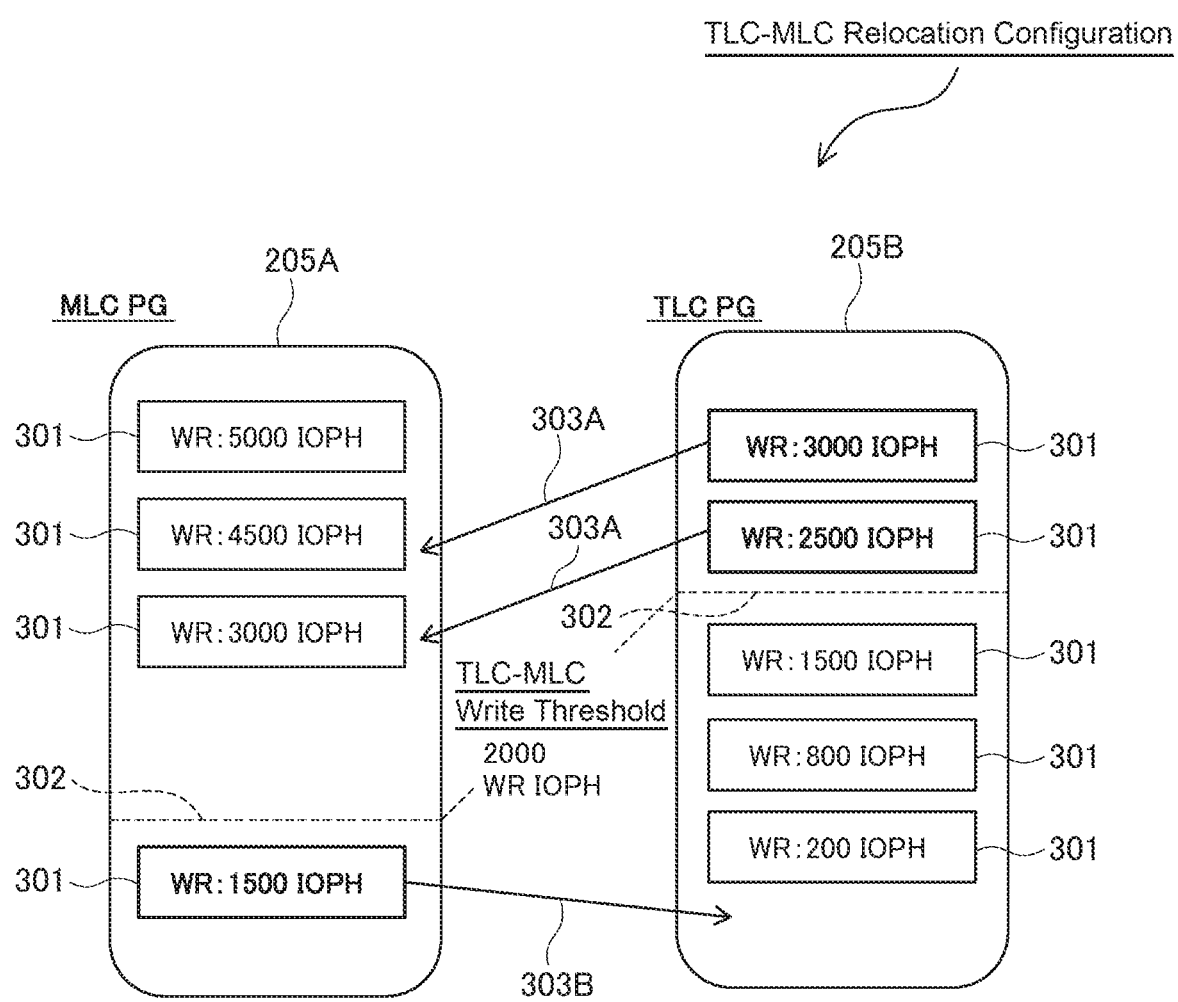
FIG. 3 is a conceptual configuration diagram of page relocation processing executed between TLC and MLC.

FIG. 3 illustrates a conceptual configuration of page relocation processing executed between TLC and MLC. In this example, pages 301 are relocated between a parity group composed of MLC SSDs (hereinafter referred to as an MLC PG) 205A and a parity group composed of TLC SSDs (hereinafter referred to as a TLC PG) 205B. Destinations to relocate the pages 301 are determined based on monitor information collected for each page 301 on the MLC PG 205A and the TLC 205B.

Specifically speaking, the number of writes for each page 301 is collected for a certain period of time; and after the expiration of a cycle, the destinations to relocate the pages 301 are determined on the basis of the write frequency of each of the MLC PG 205A and the TLC PG 205B, which is calculated based on the monitor information, and a TLC-MLC write threshold 302.

Referring to FIG. 3, pages 301 whose write load, that is, the TLC-MLC write threshold 302 is 2000 or more are relocated to the MLC PG 205A (arrows 303A), while a page 301 whose write load is less than 2000 is relocated to the TLC PG (arrow 303B).

In this way, between the MLC PG 205A and the TLC PG 205B which are composed of SSDs with different service lifes, pages with high write frequency are relocated to the MLC PG 205A which is composed of SSDs whose upper limit number of writes is large, and pages with low write frequency are relocated to the TLC PG 205B which is composed of SSDs whose upper limit number of writes is small.

As a result, the number of writes can be reduced at the TLC PG 205B which is composed of SSDs whose upper limit number of writes is small, and the service life of the SSDs whose upper limit number of writes is small (TLC SSDs in this example) can be extended.

Figure 4:
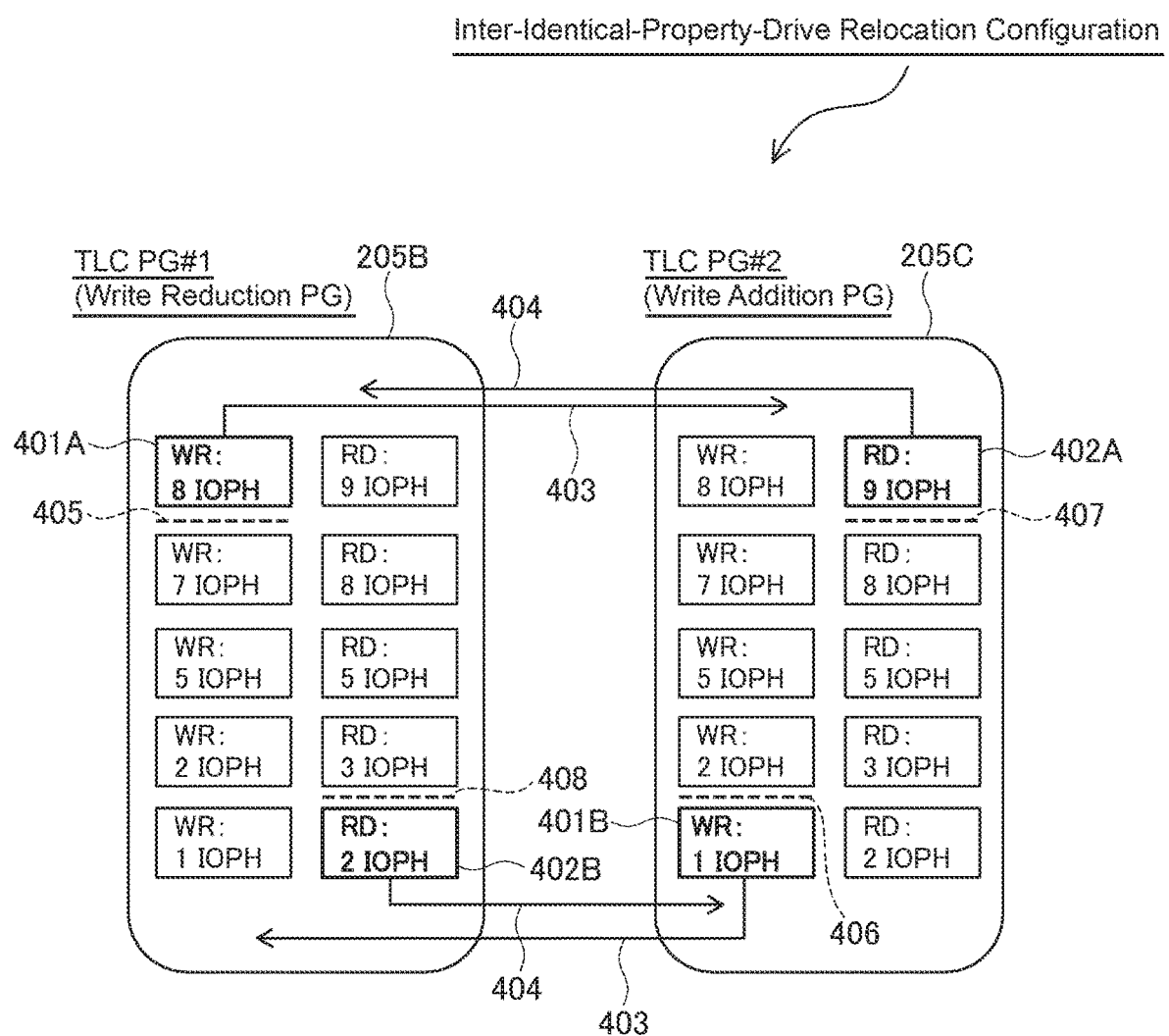
FIG. 4 is a conceptual configuration diagram of the page relocation processing executed between TLC and TLC.

FIG. 4 illustrates a conceptual configuration of page relocation processing executed between drives with the same properties (between TLC and TLC or between MLC and MLC). The page relocation processing executed between drives with the same properties is performed with the purpose of adjusting the write frequency between parity groups composed of SSDs whose upper limit numbers of writes are almost the same.

Practically, processing for performing the following two types of rebalance is executed: write rebalance to adjust the write frequency between the parity groups; and performance rebalance to adjust I/O frequency between the parity groups which have fallen apart by the write rebalance.

Now, the write rebalance and the performance rebalance which are performed between TLC PGs will be explained. Firstly, regarding the write rebalance, write frequency which needs to be reduced in order to guarantee the service life (hereinafter referred to as the required write reduction amount) or write frequency which can be added within the range capable of guaranteeing the service life (hereinafter referred to as the possible write addition amount) are calculated for each parity group.

Under this circumstance, a parity group whose required write reduction amount is a positive value is defined as a write reduction PG 205B and a parity group whose possible write addition amount is a positive value is defined as a write addition PG 205C. Then, a page 401A with a high write load in the write reduction PG 205B and a page 401B with a low write load in the write addition PG 205C are migrated to each other (arrows 403), thereby adjusting the write frequency between the parity groups.

A target page to be migrated at the time of the write rebalance is determined on the basis of thresholds based on the monitor information. Such thresholds are: a threshold for determining a page with a high write load (hereinafter referred to as the write reduction threshold) 405; and a threshold for determining a page with a low write load (hereinafter referred to as the write addition threshold) 406. When the write rebalance is performed, the page 401A whose write frequency is equal to or higher than the write reduction threshold 405 becomes a migration target in the write reduction PG 205B; and the page 401B whose write frequency is equal to or lower than the write addition threshold 406 becomes a migration target in the write addition PG 205C. Then, the write frequency is adjusted by migrating each page.

The number of pages to be migrated is determined by calculating the write frequency to be migrated by one-time page migration and calculating the necessary number of pages to be migrated to satisfy the targeted, required write reduction amount (hereinafter referred to as the number of migration-planned pages) in advance. Then, as many pages as this calculated number of migration-planned pages are migrated (or relocated).

Next, the performance rebalance adjusts the I/O frequency, which is calculated by tallying the read frequency and the write frequency of each parity group, between the parity groups by migrating the read frequency as much as the write frequency migrated by the write rebalance in an opposite direction of the write rebalance. Specifically speaking, the read frequency between the parity groups is adjusted by migrating a page 402B with a low read load in the write reduction PG 205B and a page 402A with a high read load in the write addition PG 205C (arrows 404).

A target page to be migrated at the time of the performance rebalance is determined on the basis of thresholds based on the monitor information. Such thresholds are: a threshold for determining a page with a high read load (hereinafter referred to as the read reduction threshold) 407; and a threshold for determining a page with a low read load (hereinafter referred to as the read addition threshold) 408.

When the performance rebalance is performed, the page 402B whose read frequency is equal to or lower than the read addition threshold 408 becomes a migration target in the write reduction PG 205B; and the page 402A whose read frequency is equal to or higher than the read reduction threshold 40y becomes a migration target in the write addition PG 205C. Then, the read frequency is adjusted by migrating each page. The number of pages to be migrated is determined by calculating the number of migration-planned pages in advance in the same manner as in the case of the write rebalance. Then, as many pages as this calculated number of migration-planned pages are migrated (or relocated).

(1-4) Internal Configuration of Memory

Figure 5:
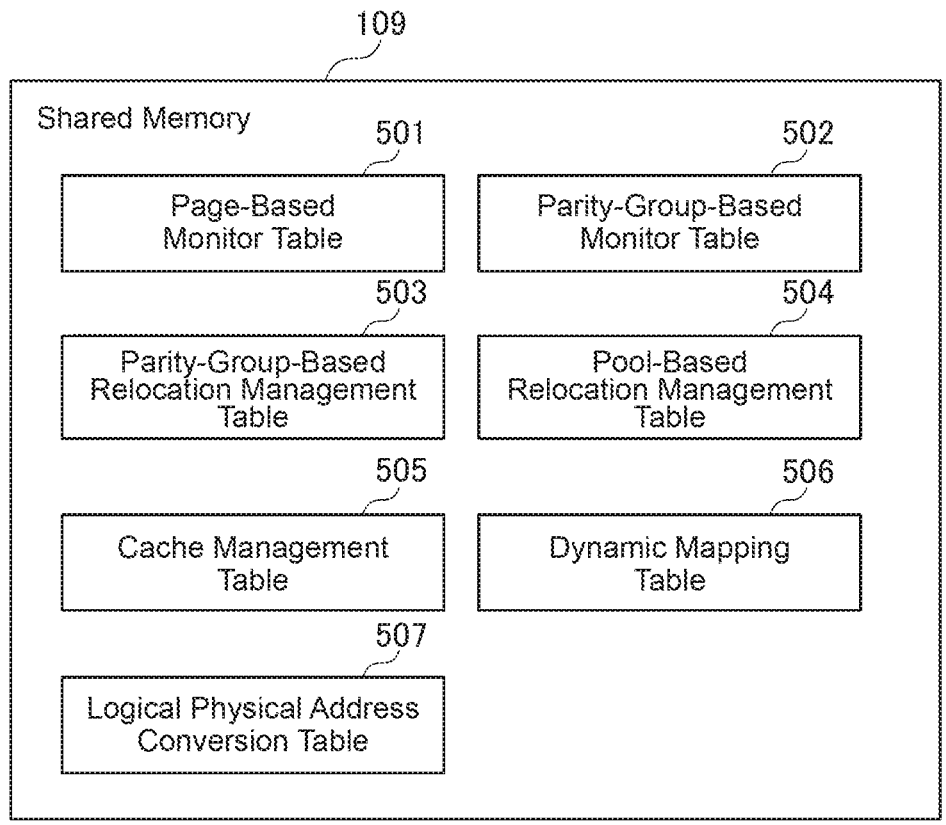
FIG. 5 is an internal configuration diagram of a shared memory.

FIG. 5 illustrates an internal configuration of the shared memory 109. The shared memory 109 stores a page-based monitor table 501, a parity-group-based monitor table 502, a parity-group-based relocation management table 503, a pool-based relocation management table 504, a cache management table 505, a dynamic mapping table 506, and a logical physical address conversion table 507.

The page-based monitor table 501 is a table for managing monitor information of each page including the number of inputs/outputs; and the parity-group-based monitor table 502 is a table for managing monitor information of each parity group including the number of inputs/outputs. Moreover, the parity-group-based relocation management table 503 is a table for managing control information about the page relocation of each parity group.

The pool-based relocation management table 504 is a table for managing control information about the page relocation of each pool; and the cache management table 505 is a table for retaining the management of a dirty/clean state of data in the cache memory 108 when storing data in the cache memory 108.

Furthermore, when data to be written to the virtual volume 202 is cached, the pool-based relocation management table 504 is a table for managing the address of the cache memory 108 and the address for specifying the relevant page 201 of the virtual volume 202 by associating them with each other.

The dynamic mapping table 506 is a table for managing the correspondence relationship between each page 201 of the virtual volume 202, the page 207 of the pool volume 206 allocated to each page 201, and the monitor information of each page 201.

The logical physical address conversion table 507 is a table for managing the correspondence relationship between a parity group, a pool volume, and the address of the parity group corresponding to a physical disk for storing data of the pool volume.

Figure 6:
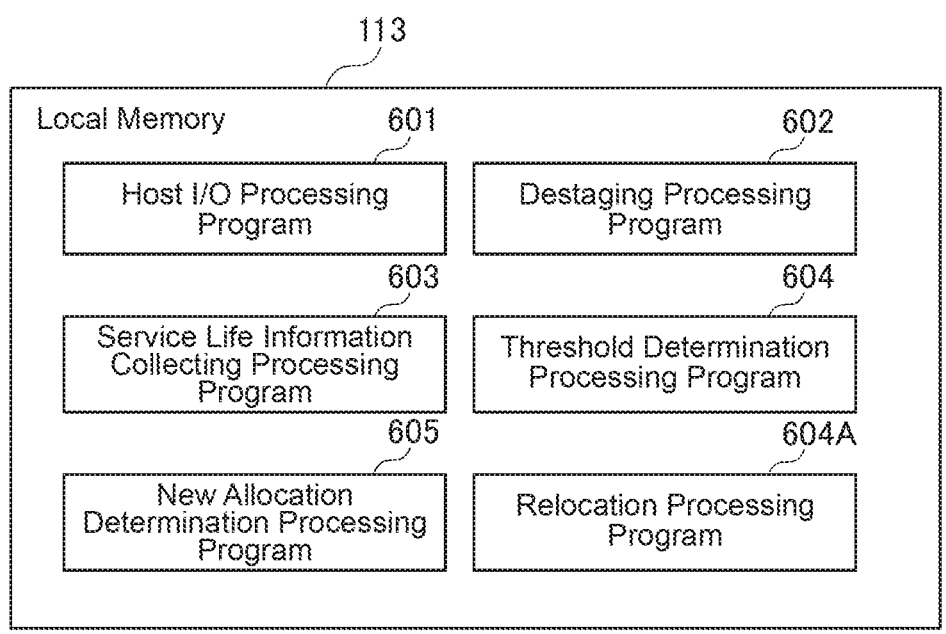
FIG. 6 is an internal configuration diagram of a local memory.

FIG. 6 illustrates an internal configuration of the local memory 113. The local memory 113 stores a host I/O processing program 601, a destaging processing program 602, a service life information collecting processing program 603, a threshold determination processing program 604, a relocation processing program 604A, and a new allocation determination processing program 605. These various kinds of programs are executed by the processor 114.

The host I/O processing program 601 is a program for processing a read request or a write request to the virtual volume 202 when receiving an I/O request from the host 101. The destaging processing program 602 is a program for storing data, which is not reflected in the physical disk in the cache memory 108, in the physical disk. This processing is executed asynchronously with the processing on the I/O request from the host 101.

The service life information collecting processing program 603 is a program for issuing a command to the drives 111 and 112 in a specified cycle to collect service life information and reflecting the collected information in the shared memory 109. The threshold determination processing program 604 is a program for calculating a threshold for the page relocation on the basis of the monitor information collected in the specified cycle and the service life information of the drives 111 and 112.

The relocation processing program 604A is a program which is invoked by the threshold determination processing program 604 and relocates pages on the basis of various kinds of thresholds determined by the threshold determination processing program 604. The new allocation determination processing program 605 is a program which is executed synchronously with the host I/O processing program 601 and determines a parity group 205, which is an allocation destination of a real page, for a new virtual page in the virtual volume 202 on the basis of a threshold.

(1-5) Table Structure

FIG. 7 illustrates a logical configuration of the page-based monitor table 501. The page-based monitor table 501 is composed of a page number row 701, a write I/O counter row 702, a read I/O counter row 703, a total I/O counter row 704, and a new write flag row 705.

The page number row 701 stores a page number for specifying a page 201; and the write I/O counter row 702 stores the number of writes in a certain cycle. Moreover, the read I/O counter row 703 stores the number of reads in the certain cycle; and the total I/O counter row 704 stores the total number of inputs/outputs which is a sum of the number of reads and the number of writes in the certain cycle.

The cycle is the same cycle as that for the aforementioned threshold determination processing program 604 to collect the monitor information; and the monitor information in this certain period is a processing target of the threshold determination processing program 604. Moreover, the new write flag row 705 stores a flag indicative of whether the relevant page is a newly allocated page or not.

FIG. 8 illustrates a logical configuration of the parity-group-based monitor table 502. The parity-group-based monitor table 502 is composed of a parity group number row 801, a maximum write frequency row 802, a minimum write frequency row 803, a maximum read frequency row 804, a minimum read frequency row 805, a read/write ratio row 806, a possible write addition amount row 807, a required write reduction amount row 808, a new write I/O counter row 809, a new write ratio row 810, an average I/O frequency row 811, and a number-of-allocated-pages row 812.

The parity group number row 801 stores a parity group number for specifying a parity group 205; and the maximum write frequency row 802 stores maximum write frequency of pages in the relevant parity group. Moreover, the minimum write frequency row 803 stores minimum write frequency of pages in the relevant parity group.

The maximum read frequency row 804 stores maximum read frequency of pages in the relevant parity group; and the minimum read frequency row 805 stores minimum read frequency of pages in the relevant parity group. Furthermore, the read/write ratio row 806 stores a ratio of the number of reads to the number of writes with respect to the relevant parity group.

The possible write addition amount row 807 stores write frequency which can be added to the relevant parity group within the range capable of guaranteeing the service life; and the required write reduction amount row 808 stores write frequency which needs to be reduced from the relevant parity group in order to guarantee the service life. The possible write addition amount row 807 and the required write reduction amount row 808 store values calculated on the basis of the write frequency of the parity group and the service life information of the SSDs and either one of them becomes a positive value.

When the service life information which can be collected from the SSDs is the possible write addition rate and the required write reduction rate, the values to be stored in the possible write addition amount row 807 and the required write reduction amount row 808 can be calculated by calculation of Expressions 1 and 2 below.

Incidentally, the possible write addition rate is a rate of write frequency which can be added when the write frequency in the current state is 100%; and the required write reduction rate is a rate of write frequency which should be reduced in order to maintain the service life when the write frequency in the current state is 100%.

[Math. 1]

$$\text{Possible Write Addition Amount [IOPH (Input Output Per Hour)]} = \text{Min (Possible Write Addition Rate of All SSDs Constituting Parity Group [\%])} \times \text{Write Frequency of Parity Group [IOPH]} \quad (1)$$

[Math. 2]

$$\text{Required Write Reduction Amount [IOPH(Input Output Per Hour)]} = \text{Max (Required Write Reduction Rate of All SSDs Constituting Parity Group [\%])} \times \text{Write Frequency of Parity Group [IOPH]} \quad (2)$$

The new write I/O counter row 809 stores the number of new writes to the relevant parity group; and the new write ratio row 810 stores a ratio of update writes to new writes from among the write processing on the parity group. Moreover, the average I/O frequency row 811 stores average I/O frequency of each page in the parity group; and the number-of-allocated-pages row 812 stores the number of pages allocated to the parity group.

FIG. 9 illustrates a logical configuration of the parity-group-based relocation management table 503. The parity-group-based relocation management table 503 is composed of a parity group number row 901, a media type row 902, a migration source PG type row 903, a migration destination PG row 904, a write reduction threshold row 905, a write addition threshold row 906, a read reduction threshold row 907, a read addition threshold row 908, number-of-migration-planned-pages rows 909A and 909B, number-of-migration-performed-pages rows 910A and 910B, and a new writable amount row 911.

The parity group number row 901 stores a parity group number for specifying the relevant parity group; and the media type row 902 stores information about the property of SSDs constituting the relevant parity group. Moreover, the migration source PG type row 903 stores information indicative of either a write reduction PG or a write addition PG. The migration source PG type is determined based on information stored in the possible write addition amount row 807 or the required write reduction amount row 808 of the parity-group-based monitor table 502.

Specifically speaking, when a positive value is stored in the possible write addition amount row 807, information indicative of the write addition PG is stored in the migration source PG type row 903 of this parity group. Moreover, when a positive value is stored in the required write reduction amount row 808, information indicative of the write reduction PG is stored in the migration source PG type 903 of this parity group.

The migration destination PG row 904 stores a parity group number of a migration destination when executing the page relocation. Regarding the parity group number of the migration destination, a parity group whose relocation progress is the lowest may be determined as the migration destination. The relocation progress can be calculated by calculating Expression 3 below by using the number-of-migration-planned-pages rows 909A and 909B and the number-of-migration-performed-pages rows 910A and 910B.

[Math. 3]

$$\text{Relocation Progress} = \text{The Number of Migration-performed Pages}/\text{The Number of Migration-Planned Pages} \quad (3)$$

The write reduction threshold row 905 stores a threshold for determining a migration target page when performing the write rebalance of the write reduction PG; and the write addition threshold row 906 stores a threshold for determining a migration target page when performing the write rebalance of the write addition PG.

The read reduction threshold row 907 stores a threshold for determining a migration target page when performing the performance rebalance of the write addition PG; and the read addition threshold row 908 stores a threshold for determining a migration target page when performing the performance rebalance of the write reduction PG. The write reduction threshold, the write addition threshold, the read reduction threshold, and the read addition threshold can be calculated by calculation of Expression 4 below.

[Math. 4]

$$\text{Write Reduction Threshold [IOPH]} = \text{Maximum Write Frequency [IOPH]} \times 0.7 \text{ Write Addition Threshold [IOPH]} = \text{Minimum Write Frequency [IOPH]} \times 1.3 \text{ Read Reduction Threshold [IOPH]} = \text{Maximum Read Frequency [IOPH]} \times 0.7 \text{ Read Addition Threshold [IOPH]} = \text{Minimum Read Frequency [IOPH]} \times 1.3 \quad (4)$$

The number-of-migration-planned-pages (write rebalance) row 909A stores the number of necessary pages to be migrated in order to adjust the write frequency between parity groups composed of SSDs with the same property; and the number-of-migration-planned-pages (performance rebalance) row 909B stores the number of necessary pages to be migrated in order to adjust the I/O frequency including the read frequency between the parity groups composed of the SSDs with the same property. The number of migration-planned pages for the write rebalance can be calculated by calculation of Expression 5 below.

[Math. 5]

$$\text{The Number of Migration-Planned Pages for Write Rebalance [Pages]} = \text{Target Migration Amount [IOPH]}/\text{I/O Frequency Changed by One-Time Page Migration [IOPH/page]}$$

$$\text{Target Migration Amount [IOPH]} = \text{Min (Possible Write Addition Amount [IOPH], Required Write Reduction Amount [IOPH])}$$

$$\text{I/O Frequency Changed by One-Time Page Migration [IOPH/page]} = (\text{Average I/O Frequency of Migration Target Page of Write Addition PG [IOPH]} - \text{Average I/O Frequency of Migration Target Page of Write Reduction PG [IOPH]}) \div 2 \quad (5)$$

Furthermore, the number of migration-planned pages for the performance rebalance can be calculated by calculation of Expression 6 below.

[Math. 6]

$$\text{The Number of Migration-Planned Pages for Performance Rebalance [Pages]} = \text{Target Migration Amount [IOPH]} \div \text{I/O Frequency Changed by One-Time Page Migration [IOPH/page]}$$

$$\text{Target Migration Amount [IOPH]} = ((\text{Write Frequency Migrated by Write Rebalance [IOPH]} \times 2) + (\text{Average I/O Frequency of Write Addition PG [IOPH]} - \text{Average I/O Frequency of Write Reduction PG [IOPH]})) \div 2$$

$$\text{I/O Frequency Changed by One-Time Page Migration [IOPH]} = (\text{Average I/O Frequency of Migration Target Page of Write Addition PG [IOPH]} - \text{Average I/O Frequency of Migration Target Page of Write Reduction PG [IOPH]}) \div 2 \quad (6)$$

The number-of-migration-performed-pages (write rebalance) row 910A stores the number of pages migrated to another parity group for the purpose of the write rebalance; and the number-of-migration-performed-pages (performance rebalance) row 910B stores the number of pages migrated to another parity group for the purpose of the performance rebalance. The new writable amount row 912 stores the number of new writes which can be processed in the relevant parity group. The new writable amount can be calculated by calculation of Expression 7 below.

[Math. 7]

$$\text{New Writable Amount [I/O]} = \text{Write Frequency After Migration of Parity Group [IOPH]} \times \text{New Allocation Rate [\%]} \times \text{Relocation Cycle [H]} \quad (7)$$

FIG. 10 illustrates a logical configuration of the pool-based relocation management table 504. The pool-based relocation management table 504 is composed of a pool number row 1001, a service life control relocation cycle row 1002, a TLC-MLC write threshold row 1003, a new write threshold row 1004, a workload type row 1005, a new-allocation-policy-between-identical-type-drives row 1006, a new allocation buffer row 1007, and a relocation buffer row 1008.

The pool number row 1001 stores a pool number for specifying the relevant pool; and the service life control relocation cycle row 1002 stores a cycle for executing the page relocation by means of service life control of the pool. Moreover, the TLC-MLC write threshold row 1003 stores a threshold for determining to which type of parity group the relevant page(s) should be located when relocating the page(s) between a TLC PG and an MLC PG. The TLC-MLC write threshold can be calculated by calculation of Expression 8 below.

[Math. 8]

TLC-MLC Write Threshold [IOPH]=Ave (Limit Write Threshold of All TLC PGs [IOPH])

Limit Write Threshold of TLC PG [IOPH]=IF (Migration Source PG Type of the Relevant Parity Group Is Write Addition PG?) Write Frequency of the Relevant Parity Group [IOPH]+Possible Write Addition Amount [IOPH]

ELSE IF (Migration Source PG Type of the Relevant Parity Group Is Write Reduction PG?) Write Frequency of the Relevant PG [IOPH]− Required Write Reduction Amount [IOPH]   (8)

The new write threshold row 1004 stores a threshold for determining from which parity group, either the TLC PG or the MLC PG, a real page should be allocated to a new page when executing the allocation processing on the new page in the relevant pool. The new write threshold may be designated the storage system 104 as a penalty (=data size per page) when migrating the page.

The workload type row 1005 stores property information of an I/O request issued from the host 101 to the virtual volume associated with the relevant pool. Examples of the workload type include, for example, Write Intensive, Read Intensive, and Unknown.

Write Intensive means that its write rate is high among I/O requests from the host 101; Read Intensive means that its read rate is high among the I/O requests from the host 101; and Unknown means that its write/read ratio is unknown among the I/O requests from the host 101. The workload type may be designated by the user or determined automatically by the storage system 104.

The new-allocation-policy-between-identical-type-drives row 1006 stores information for determining from which parity group in the TLC PG or in the MLC PG a real page should be allocated to the new page by new allocation processing. The new allocation policy includes, for example, round robin to allocate a real page sequentially among the parity groups, the priority on capacity to allocate a real page from a parity group with a large capacity, or the priority on service life to allocate a real page from a parity group with a large possible write addition amount. The new allocation policy may be designated by the user or determined automatically by the storage system 104.

The new allocation buffer row 1007 stores a rate of a buffer used for the new allocation processing in the pool with respect to the pool capacity. The relocation buffer row 1008 stores a rate of a buffer used for the page relocation processing in the pool with respect to the pool capacity. Incidentally, in this pool-based relocation management table 504, one entry for storing a default value of relocation control information exists and the default value is stored with respect to the control information which is not designated by the user.

(1-6) Flowcharts

Figure 11:
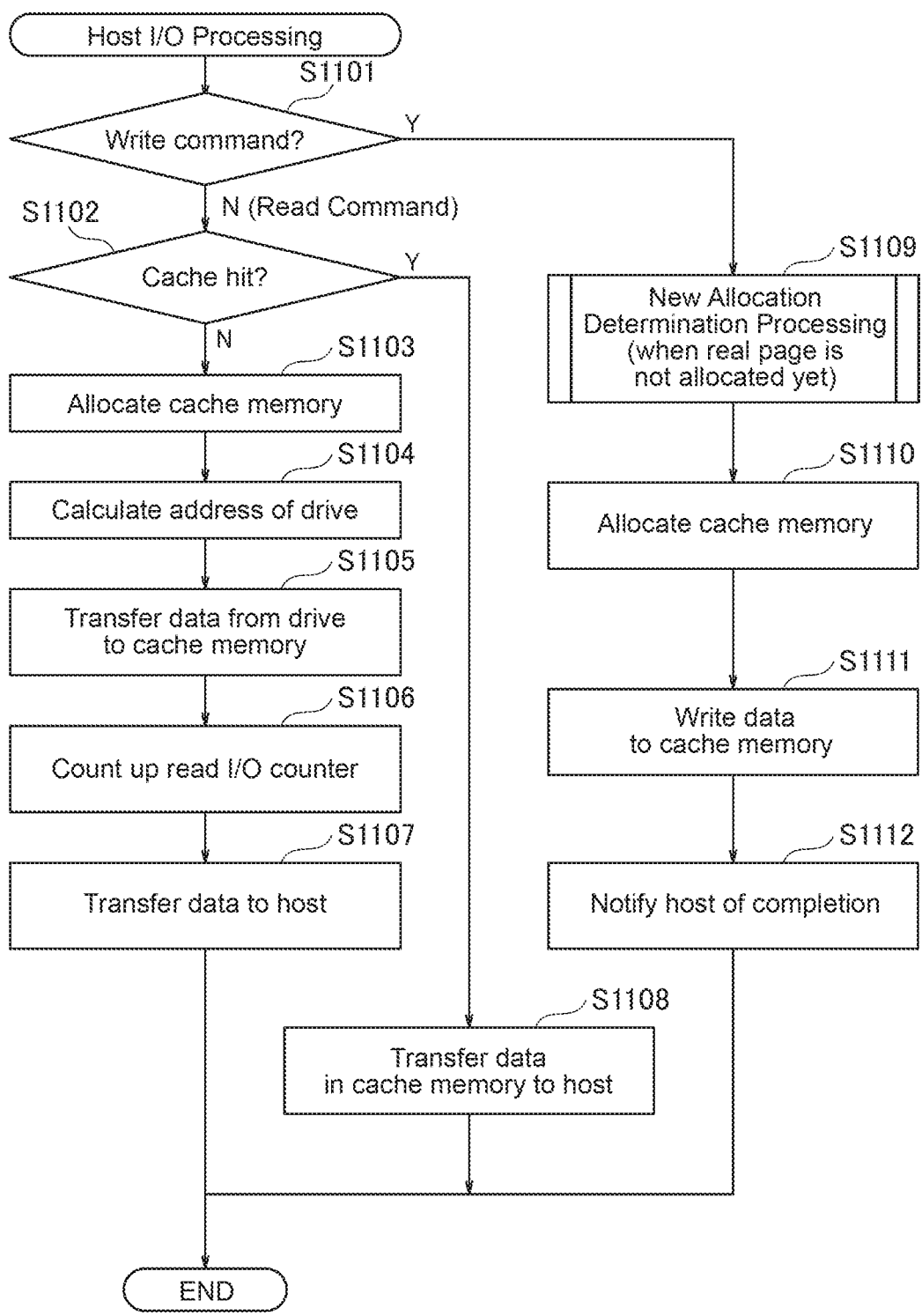
FIG. 11 is a flowchart of host I/O processing.

FIG. 11 illustrates a flowchart of host I/O processing. This host I/O processing is executed by the processor 114 and the host I/O processing program 601 in cooperation with each other as triggered by the storage system 104 receiving an I/O request from the host 101. For the purpose of illustration, the following explanation will be given by referring to the host I/O processing program 601 as the processing subject.

After receiving an I/O processing request from the host 101, the host I/O processing program 601 judges whether the received I/O processing request is a write request to write data to the virtual volume 202 or not (S1101).

Figure 19:
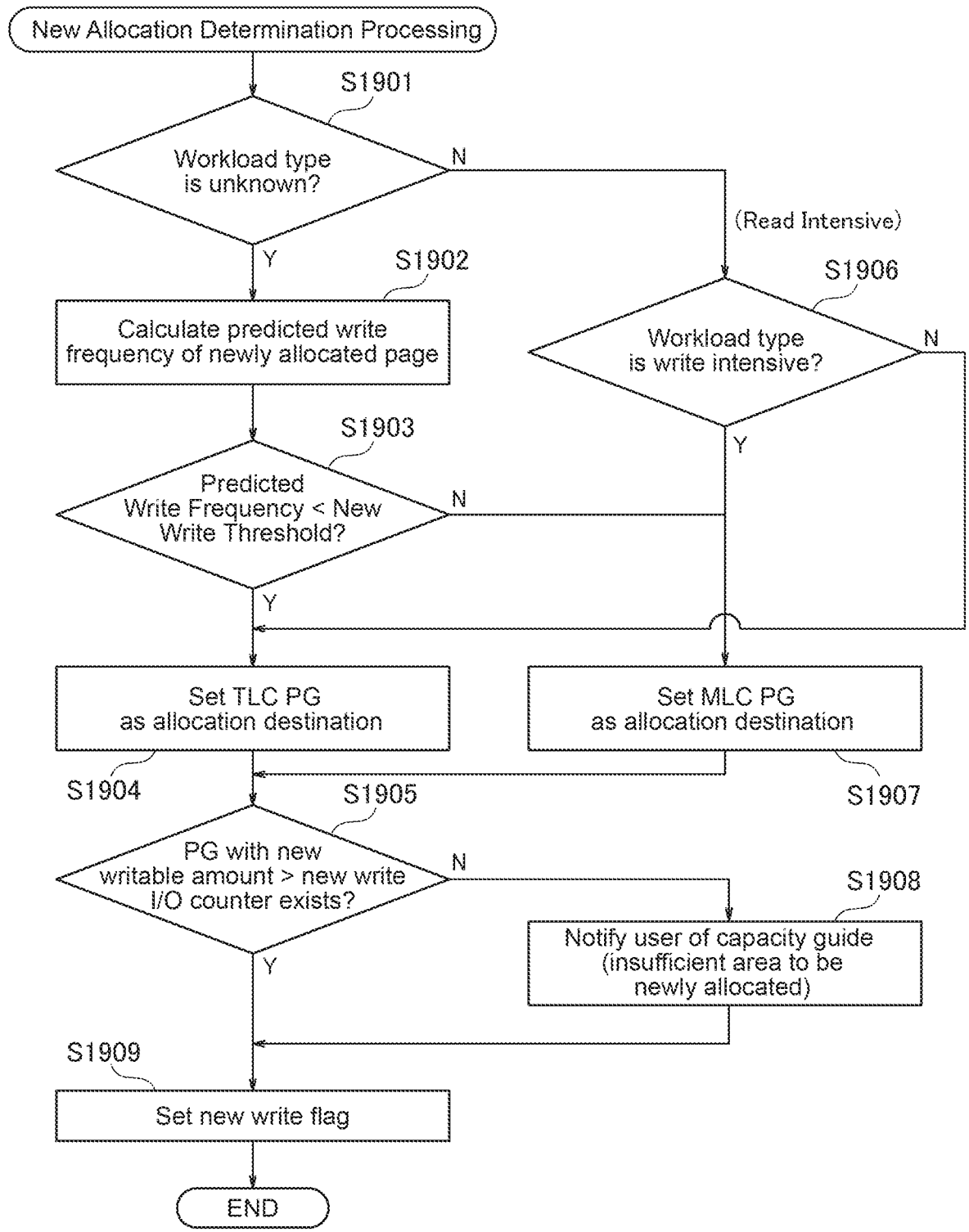
FIG. 19 is a flowchart of new allocation determination processing.

When the received I/O processing request is the write request (S1101: Y), the host I/O processing program 601 refers to the dynamic mapping table 506 and judges whether or not a real page has been allocated to a virtual page which is a write target. If the real page has not been allocated, the host I/O processing program 601 executes new allocation determination processing for allocating an unused real page (S1109). The details of the new allocation determination processing will be explained later (FIG. 19).

After executing the new allocation determination processing, the host I/O processing program 601 then checks whether an area corresponding to the address of the write target in the virtual volume 202 is allocated in the cache memory 108 or not; and if such area is not allocated, the host I/O processing program 601 allocates the area in the cache memory 108 (S1110).

Next, the host I/O processing program 601 notifies the host 101 that data to be written should be transferred. After the data is transmitted to the host 101, the host I/O processing program 601 writes this data to the area allocated in the cache memory 108 (S1111). Then, the host I/O processing program 601 sets a dirty flag, which indicates that writing of data in the relevant area to the drive 111 or 112 has not been completed, "ON" in the cache management table 505.

Under this circumstance, the dirty flag is information indicative of a state where the data is stored only in the cache memory 108 and has not been stored in the drive 111 or 112 yet. The dirty flag is set "ON" or "OFF" in the cache management table 505 to manage areas of the cache memory 108. Reference is made to the cache management table 505 during destaging processing (FIG. 12) described later.

Then, when the dirty flag is "ON," the data stored in the area in the cache memory 108 is written to the drive 111 or 112. After the data is written to the drive 111 or 112, the dirty flag is set to "OFF" and a clean flag is set "ON" in the cache management table 505 including a case where data which has been read from the drive 111 or 112 in response to read processing is stored in the cache memory 108.

In this way, the cache management table 505 manages at least the address of the virtual volume 202 corresponding to the address in the cache memory 108 and the state of the data in the cache memory 108. Incidentally, regarding the address of the virtual volume 202 corresponding to the address in the cache memory 108, the address of the virtual volume 202 which is an effective value is stored only when an area in the cache memory 108 is allocated to put the data in the virtual volume 202.

After executing the above-described processing, the host I/O processing program 601 notifies the host 101 of the completion of the I/O processing (write processing) (S1112) and terminates this processing.

When the processing returns to step S1101 and the I/O request received by the host 101 is a read request to read data from the virtual volume 202 (S1101: N), the host I/O processing program 601 refers to the cache management table 505 and judges whether data corresponding to the address in the virtual volume 202 in response to the read request is stored in the cache memory 108 or not (S1102).

The case where the data corresponding to the address in the virtual volume 202 in response to the read request is stored in the cache memory 108 is called a cache hit. When there is a cache hit (S1102: Y), the host I/O processing program 601 transfers the data in the cache memory 108 to the host 101 (S1108) and notifies the host 101 of the completion of the I/O processing (read processing) and terminates this processing.

On the other hand, when there is no cache hit (S1102: N), the host I/O processing program 601 allocates an area in the cache memory 108 for storing data corresponding to the address of the virtual volume 202 which is a read target (S1103). Next, the host I/O processing program 601 refers to the dynamic mapping table 506 and checks whether or not a real page is allocated to the address of the virtual volume 202, which is the read target, from the pool 204.

When the real page is not allocated to the virtual volume 202, the host I/O processing program 601 refers to the dynamic mapping table 506, calculates the address of a page storing a default value in the drive 111 or 112 by using the default value storing page, and transfers the default value from the drive 111 or 112 to the area of the cache memory 108 (S1105).

Under this circumstance, in a case of the default value, the pool volume number and the logical address at which the default value storing page exists are set to the pool volume number and the logical address corresponding to the virtual volume 202 and the logical address of the dynamic mapping table 506. One or more default value storing pages may exist in the pool 204. In consideration of capacity efficiency, there may be one or more default value pages in the pool 204.

When new data is written from the host 101, the logical address of the virtual volume 202 associated with the address of the default value storing page is newly associated with a page which is for writing data of the host 101 and has not been associated with the address of any virtual volume 202 yet.

On the other hand, when a real page is allocated to the virtual volume 202, the host I/O processing program 601 refers to the dynamic mapping table 506 and acquires the pool volume number and the logical address, and further refers to the logical physical address conversion table 507 and calculates a physical drive number and a physical start address, thereby calculating the address of the drive 111 or 112 where the data corresponding to the address of the virtual volume 202 which is the read target is stored (S1104).

Next, the host I/O processing program 601 transfers the data from the calculated address to the area in the cache memory 108 (S1105). Then, when reading the data, the host I/O processing program 601 refers to the page-based monitor table 501 and counts up the numerical value of the read I/O counter (S1106).

Then, the host I/O processing program 601 transfers the data stored in the cache memory 108 from the drive 111 or 112 to the host 101 (S1107), notifies the host 101 of the completion of the I/O processing (read processing), and terminates this processing.

As a result of the above-described processing, the host I/O processing can be executed and necessary monitor information can be collected.

Figure 12:
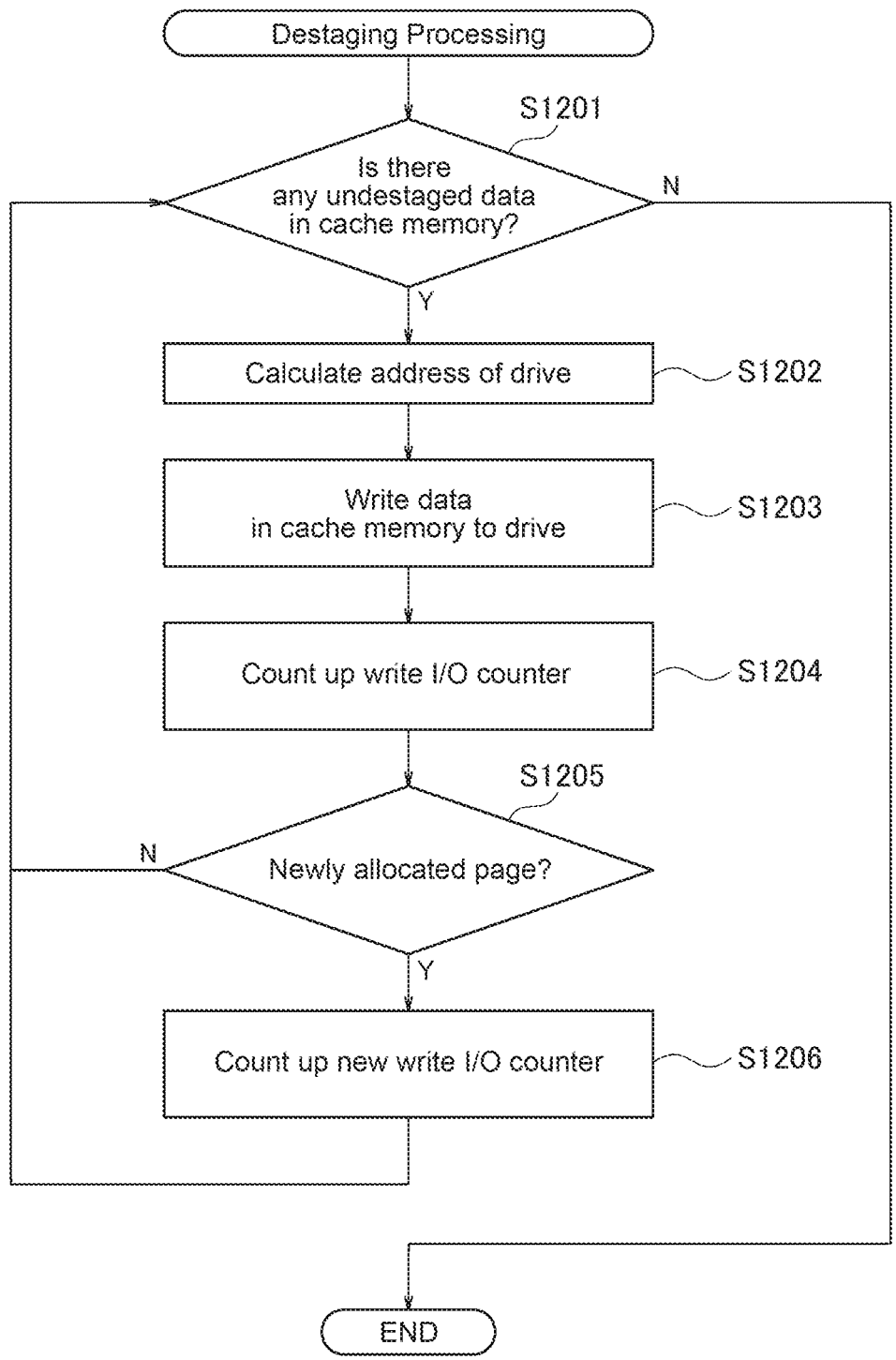
FIG. 12 is a flowchart of destaging processing.

FIG. 12 illustrates a flowchart of destaging processing. This destaging processing is executed as necessary by the processor 114 and the destaging processing program 602 in cooperation with each other and asynchronously with the host I/O processing (FIG. 11). For the purpose of illustration, the following explanation will be given by referring to the destaging processing program 602 as the processing subject.

The destaging processing program 602 firstly refers to the cache management table 505, checks whether the dirty flag is ON or OFF, and judges whether unreflected data which is not written to the drive 111 or 112 exists in the cache memory 108 or not (S1201).

When the unreflected data exists in the cache memory 108, the destaging processing program 602 acquires the virtual volume number and the logical address from the cache management table 505. Then, the destaging processing program 602 refers to the dynamic mapping table 506 on the basis of this virtual volume number and the logical address and acquires the pool volume number and the logical address.

Under this circumstance, when the pool volume number and the logical address are the address of the default value storing page, the destaging processing program 602 allocates a new empty page from the dynamic mapping table 506 to write the new data. Then, the destaging processing program 602 stores the pool volume number and the logical address of this allocated page by associating them with the corresponding virtual volume number and logical address of the dynamic mapping table 506.

When the page has already been allocated, the pool volume number and the logical address which are different values from the pool volume number and the logical address of the default value are associated with the logical address of the virtual volume and are stored. After acquiring the pool volume number and the logical address, the destaging processing program 602 refers to the logical physical address conversion table 507 and calculates the address of the drive 111 or 112 (S1202).

Next, the destaging processing program 602 writes the unreflected data in the cache memory 108 to the calculated address of the drive 111 or 112 (S1203). Then, the destaging processing program 602 refers to the page-based monitor table 501 corresponding to the page number of the dynamic mapping table 506 and counts up the numerical value of the write I/O counter (S1204).

Subsequently, the destaging processing program 602 refers to the new write flag row 705 of the page-based monitor table 501 and judges whether the target page of the destaging processing is a newly allocated page or not (S1205). When the target page of the destaging processing is the newly allocated page (S1205: Y), the destaging processing program 602 refers to the parity-group-based monitor table 502 corresponding to a parity group, in which this page is stored, and counts up the numerical value of the new write I/O counter (S1206).

On the other hand, when the target page of the destaging processing is not a newly allocated page (S1205: N), the destaging processing program 602 proceeds to step S1201. In step S1201, the destaging processing program 602 judges whether unreflected data further exists in the cache memory 108 or not. Then, when there is no further unreflected data (S1201: N), the destaging processing program 602 terminates this processing.

As a result of the above-described processing, data in the cache memory 108 can be stored in the drive 111 or 112 asynchronously and necessary monitor information can be collected.

FIG. 13 is a flowchart of service life information collecting processing. This service life information collecting processing is executed by the processor 114 and the service life information collecting processing program 603 in cooperation with each other in a certain cycle. For the purpose of illustration, the following explanation will be given by referring to the service life information collecting processing program 603 as the processing subject.

The service life information collecting processing program 603 firstly issues a service life collecting command to the drive 111 or 112 (S1301). Next, the service life information collecting processing program 603 receives the possible write addition rate or the required write reduction rate as service life information (S1302). Then, the service life information collecting processing program 603 stores the received service life information in the local memory 113 (S1303) and terminates this processing.

As a result of the above-described processing, the service life information can be collected from the drive 111 or 112.

FIG. 14 is a flowchart of threshold determination processing. This threshold determination processing is executed by the processor 114 and the threshold determination processing program 604 in cooperation with each other in a certain cycle. Information of the certain cycle is stored in the service life control relocation cycle row 1002 of the pool-based relocation management table 504. For the purpose of illustration, the following explanation will be given by referring to the threshold determination processing program 604 as the processing subject.

The threshold determination processing program 604 firstly judges whether tallying of the monitor information of each page has been completed with respect to all parity groups (S1401). Specifically speaking, the threshold determination processing program 604 judges whether or not information is stored in each row of the parity-group-based monitor table 502.

When the tallying has not been completed (S1401: N), the threshold determination processing program 604 invokes the service life information collecting processing program 603 and collects the service life information from the drive 111 or 112 (S1402), and tallies the monitor information of each page with respect to each parity group (S1403). When the tallying has been completed (S1401: Y), the threshold determination processing program 604 calculates various kinds of thresholds for the page relocation (S1404).

The then-calculated various kinds of threshold are stored in the respective rows in the parity-group-based monitor table 502, the parity-group-based relocation management table 503, and the pool-based relocation management table 504. Subsequently, the threshold determination processing program 604 invokes the relocation processing program 604A and executes the relocation processing (S1405), and then terminates this processing.

As a result of the above-described processing, the monitor information can be tallied with respect to each parity group and the various kinds of thresholds can be calculated based on the tallied monitor information. Then, the relocation processing can be executed by using the calculated thresholds.

Figure 15:
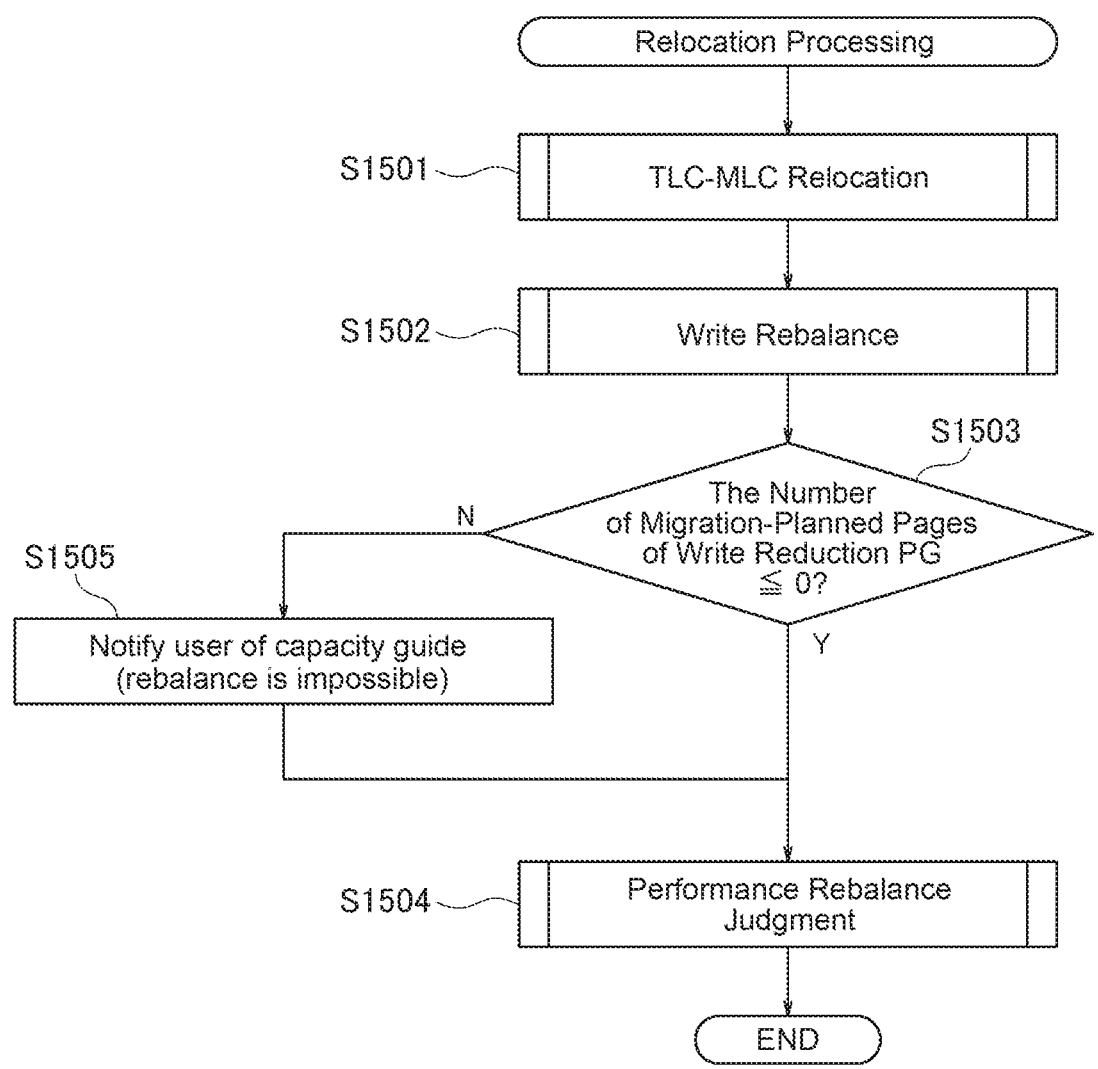
FIG. 15 is a flowchart of relocation processing.

FIG. 15 is a flowchart of relocation processing. This relocation processing is executed by the processor 114 and the relocation processing program 604A, which is invoked by the threshold determination processing program 604, in cooperation with each other. For the purpose of illustration, the following explanation will be given by referring to the relocation processing program 604A as the processing subject.

The relocation processing program 604A firstly executes TLC-MLC relocation processing for relocating a page(s) between the TLC PG and the MLC PG on the basis of the TLC-MLC write threshold calculated by the threshold determination processing program 604 (S1501).

This TLC-MLC relocation processing can extend the service life of the TLC SSD (drive 112). The TLC-MLC relocation processing can also reduce the bit cost.

Next, the relocation processing program 604A refers to the parity-group-based relocation management table 503 and executes write rebalance processing for relocating a page(s) between parity groups composed of SSDs with the same properties (between TLC PGs or between MLC PGs) on the basis of the number of migration-planned pages for the write rebalance (S1502).

This write rebalance processing can distribute write loads between the parity groups composed of SSDs with the same properties and level the service life.

Subsequently, the relocation processing program 604A refers to the parity-group-based relocation management table 503 and judges whether the number of migration-planned pages for the write rebalance for the write reduction PG is 0 or less (S1503). When the number of migration-planned pages for the write rebalance for the write reduction PG is 0 or less (S1503: Y), the relocation processing program 604A: determines that adjustment of the write frequency has been completed; and then executes performance rebalance processing (S1504).

On the other hand, when the number of migration-planned pages for the write rebalance for the write reduction PG is more than 0 (S1503: N), the current parity group configuration cannot allow the write frequency to be adjusted or the service life to be maintained, so that the relocation processing program 604A displays a warning screen and notifies the user of the capacity of a TLC SSD or an MLC SSD to be added in order to guarantee the service life (S1505).

As a result of the above-described processing, the write frequency and the read frequency between parity groups can be adjusted. Moreover, when the write frequency and the read frequency cannot be adjusted, it is possible to notify the user of the necessary capacity of the TLC SSD or the MLC SSD to maintain the service life.

Figure 16:
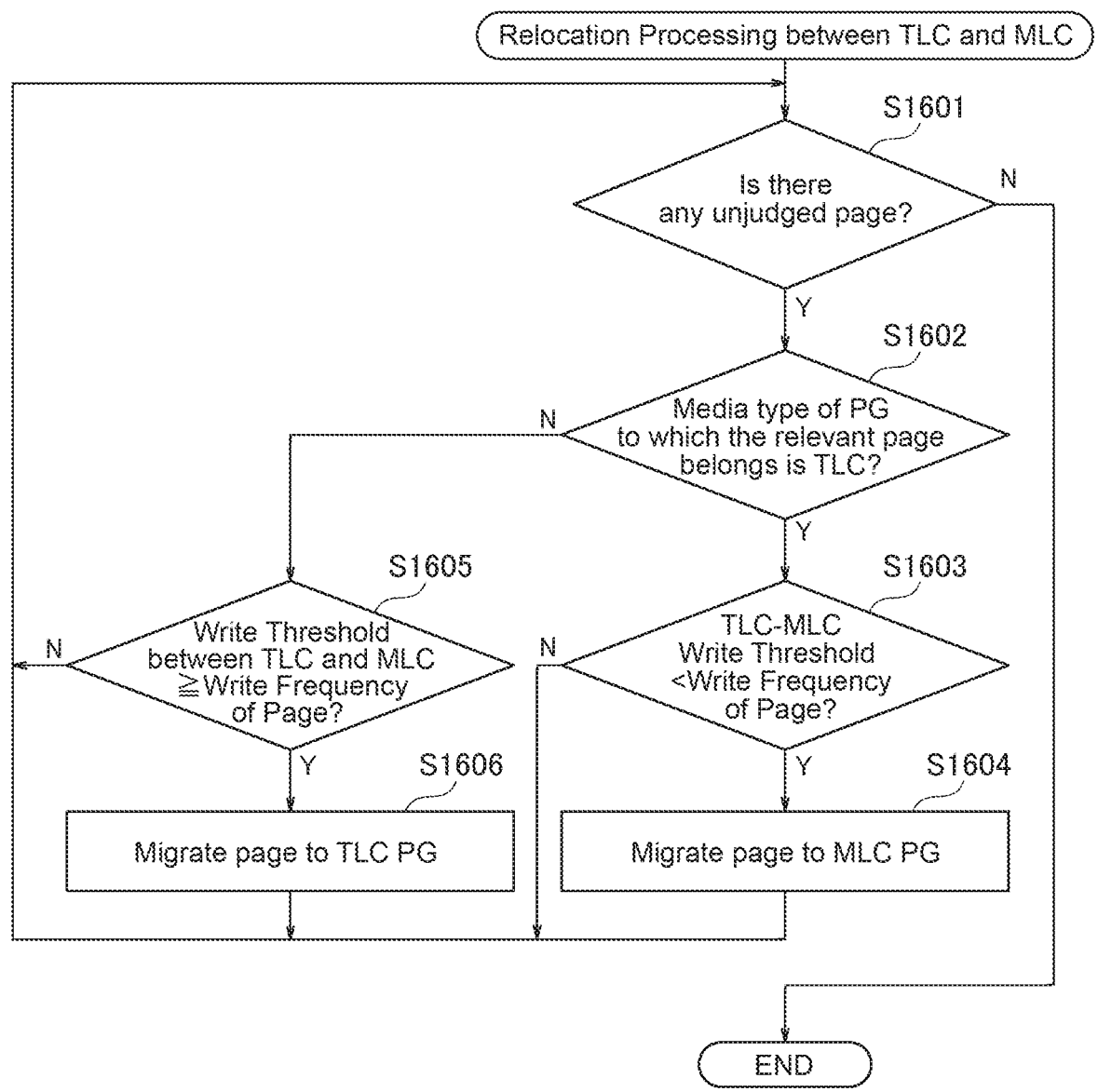
FIG. 16 is a flowchart of TLC-MLC relocation processing.

FIG. 16 is a flowchart of TLC-MLC relocation processing. This TLC-MLC relocation processing is executed by the processor 114 and the relocation processing program 604A in cooperation with each other. For the purpose of illustration, the following explanation will be given by referring to the relocation processing program 604A as the processing subject.

The relocation processing program 604A firstly relocates each page of all parity groups to the TLC PG or the MLC PG on the basis of the TLC-MLC write threshold calculated by the threshold determination processing program 604. Under this circumstance, the relocation processing program 604A judges whether there is any unjudged page for which the relocation has not been judged (S1601).

When there is an unjudged page (S1601: Y), the relocation processing program 604A refers to the parity-group-based relocation management table 503 and judges whether the media type of a parity group to which this unjudged target page belongs is a TLC or not (S1602). When the media type is the TLC (S1602: Y), the relocation processing program 604A judges whether the write frequency of the target page is equal to or more than the TLC-MLC write threshold or not (S1603).

When the write frequency of the target page is equal to or more than the TLC-MLC write threshold (S1603: Y), the relocation processing program 604A migrates this page from the TLC PG to the MLC PG (S1604). On the other hand, when the write frequency of the target page is less than the TLC-MLC write threshold (S1603: N), the relocation processing program 604A performs nothing and proceeds to step S1601.

Returning to step S1602, when the media type is the MLC (S1602: N), the relocation processing program 604A judges whether the write frequency of the target page is less than the TLC-MLC write threshold or not (S1605). When the write frequency of the target page is less than the TLC-MLC write threshold (S1605: Y), the relocation processing program 604A migrates this page from the MLC PG to the TLC PG (S1606).

On the other hand, when the write frequency of the target page is equal to or more than the TLC-MLC write threshold (S1605: N), the relocation processing program 604A performs nothing and proceeds to step S1601. After finishing judgment on each page of all the parity groups, the relocation processing program 604A terminates this processing. As a result of the above-described processing, the pages can be relocated between the TLC and the MLC, the service life of the TLC SSD (the drive 112) can be extended, and the bit cost can be reduced.

Figure 17:
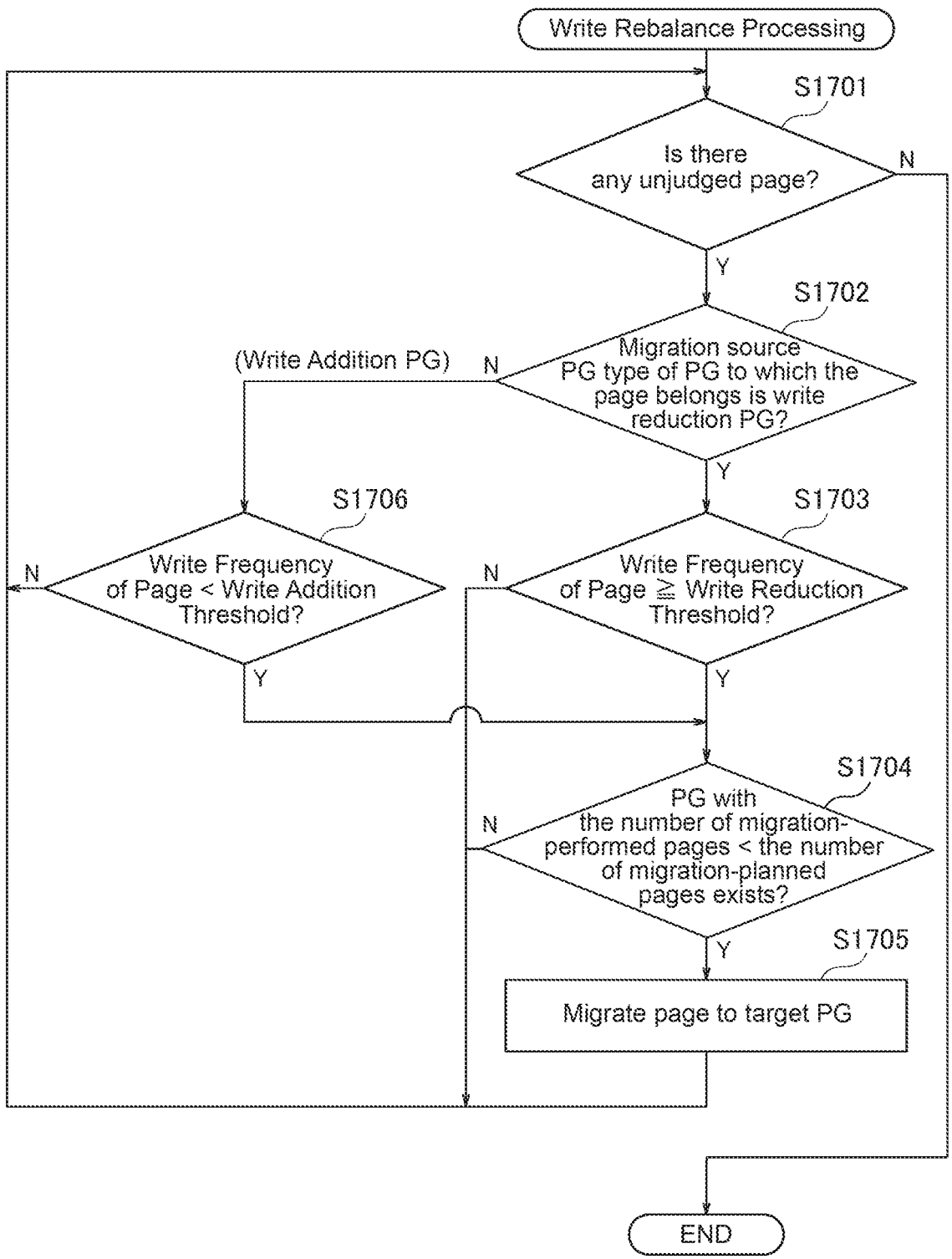
FIG. 17 is a flowchart of write rebalance processing.

FIG. 17 is a flowchart of write rebalance processing. This write rebalance processing is executed by the processor 114 and the relocation processing program 604A in cooperation with each other. For the purpose of illustration, the following explanation will be given by referring to the relocation processing program 604A as the processing subject.

The relocation processing program 604A firstly relocates a page(s) between parity groups composed of SSDs with the same property (between TLC PGs or between MLC PGs) on the basis of the number of migration-planned pages for the write rebalance, the write reduction threshold, and the write addition threshold which are calculated by the threshold determination processing program 604. Under this circumstance, the relocation processing program 604A judges whether there is any unjudged page for which the relocation has not been judged (S1701).

When there is no unjudged page (S1701: N), the relocation processing program 604A terminates this processing. On the other hand, when there is an unjudged page (S1701: Y), the relocation processing program 604A refers to the parity-group-based relocation management table 503 and judges whether a migration source PG type of a parity group to which this unjudged target page belongs is the write reduction PG or not (S1702).

When the migration source PG type of the parity group to which this unjudged target page belongs is the write reduction PG (S1702: Y), the relocation processing program 604A refers to the write I/O counter of the page-based monitor table 501 and acquires the write frequency of this target page. Then, the relocation processing program 604A judges whether the acquired write frequency is equal to or more than the write reduction threshold or not (S1703).

When the write frequency of the target page is less than the write reduction threshold (S1703: N), the relocation processing program 604A proceeds to step S1701. On the other hand, when the write frequency of the target page is equal to or more than the write reduction threshold (S1703: Y), the relocation processing program 604A determines a parity group which is the migration destination of this target page.

When determining the parity group which is the migration destination, the relocation processing program 604A refers to the parity-group-based relocation management table 503 and judges whether a parity group in which the number of migration-performed pages for the write rebalance is less than the number of migration-planned pages for the write rebalance exists in the write addition PG or not (S1704).

When the parity group in which the number of migration-performed pages for the write rebalance is less than the number of migration-planned pages for the write rebalance exists in the write addition PG (S1704: Y), the relocation processing program 604A: determines that the service life can be maintained even if the target page with a high write load is migrated to this parity group; and registers this parity group as a migration destination PG in the parity-group-based relocation management table 503 and migrates the target page to this parity group (S1705).

On the other hand, when the parity group in which the number of migration-performed pages for the write rebalance is less than the number of migration-planned pages for the write rebalance does not exist in the write addition PG (S1704: N), the relocation processing program 604A finishes the judgment on this target page and proceeds to step S1701.

Returning to step S1702, when the migration source PG type of the parity group to which the target page belongs is not the write reduction PG (S1702: N), that is, when the migration source PG type of the parity group to which the target page belongs is the write addition PG, the relocation processing program 604A refers to the write I/O counter row 702 of the page-based monitor table 501 and acquires the write frequency of this target page. Then, the relocation processing program 604A judges whether the acquired write frequency is less than the write addition threshold or not (S1706).

When the write frequency of the target page is equal to or more than the write addition threshold (S1706: N), the relocation processing program 604A proceeds to step S1701. On the other hand, when the write frequency of the target page is less than the write addition threshold (S1706: Y), the relocation processing program 604A determines a parity group which is the migration destination of this target page.

Since the processing for determining the parity group which is the migration destination is the same as the processing in steps S1704 and S1705 described above, an explanation about it has been omitted. As a result of the above-described processing, the write load can be distributed and the service life can be leveled by relocating a page(s) between different parity groups composed of SSDs with the same property.

Figure 18:
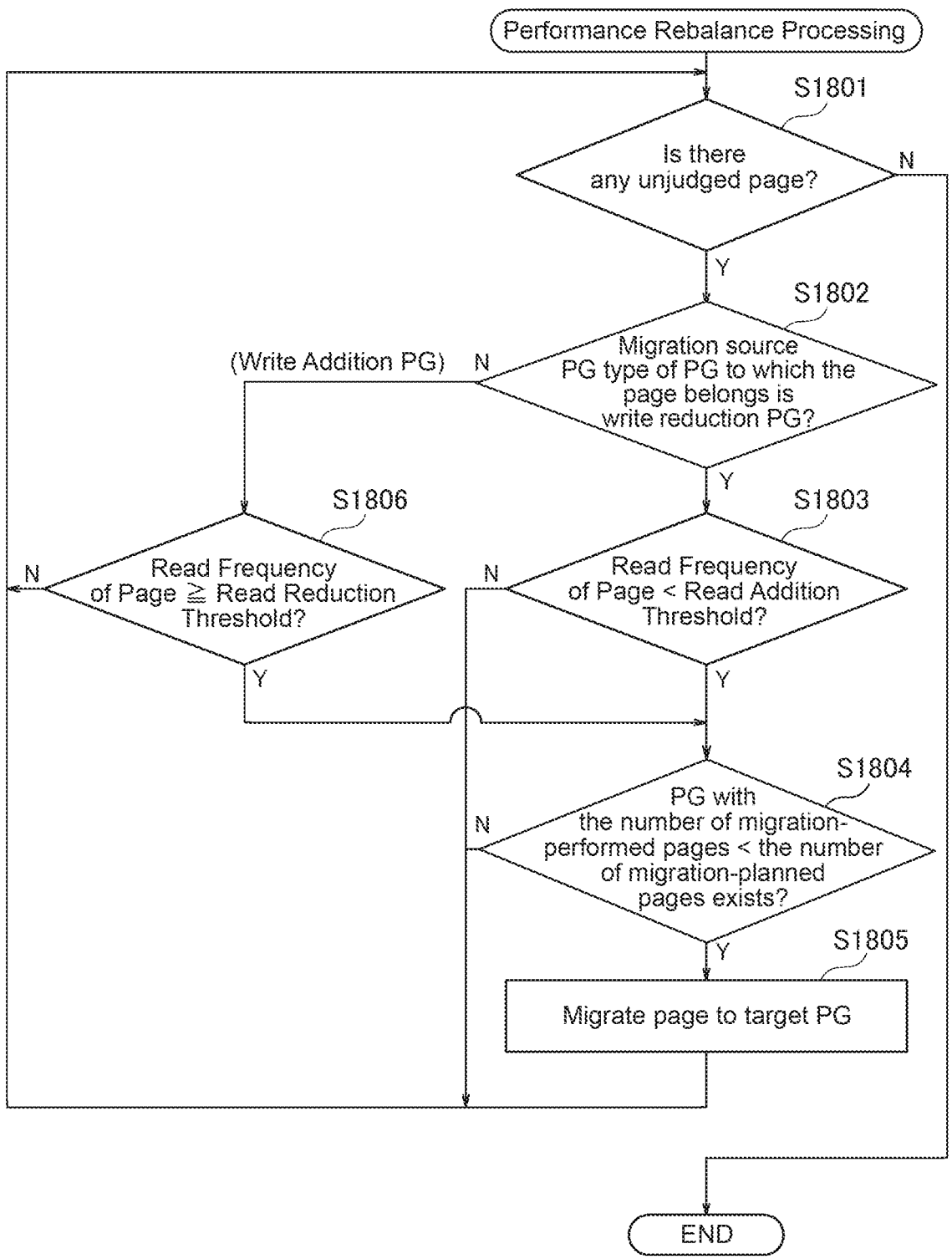
FIG. 18 is a flowchart of performance rebalance processing.

FIG. 18 is a flowchart of performance rebalance processing. This performance rebalance processing is executed by the processor 114 and the relocation processing program 604A in cooperation with each other. For the purpose of illustration, the following explanation will be given by referring to the relocation processing program 604A as the processing subject.

Incidentally, the difference between the performance rebalance processing and the write rebalance processing is that the performance rebalance processing migrates a page (s), whose read frequency is of the same degree as the write frequency adjusted by the write rebalance processing (FIG. 17), in a direction opposite to the direction migrated by the write rebalance processing; and other basic processing content is the same.

The relocation processing program 604A firstly relocates a page(s) between parity groups composed of SSDs with the same property (between TLC PGs or between MLC PGs) on the basis of the number of migration-planned pages for the performance rebalance, the write reduction threshold, and the write addition threshold which are calculated by the threshold determination processing program 604. Under this circumstance, the relocation processing program 604A judges whether there is any unjudged page for which the relocation has not been judged (S1801).

When there is no unjudged page (S1801: N), the relocation processing program 604A terminates this processing. On the other hand, when there is an unjudged page (S1801: Y), the relocation processing program 604A refers to the parity-group-based relocation management table 503 and judges whether a migration source PG type of a parity group to which this unjudged target page belongs is the write reduction PG or not (S1802).

When the migration source PG type of the parity group to which the target page belongs is the write reduction PG (S1802: Y), the relocation processing program 604A refers to the read I/O counter of the page-based monitor table 501 and acquires the read frequency of this target page. Then, the relocation processing program 604A judges whether the acquired read frequency is less than the read addition threshold or not (S1803).

When the read frequency of the target page is equal to or more than the read addition threshold (S1803: N), the relocation processing program 604A proceeds to step S1801. On the other hand, when the read frequency of the target page is less than the read addition threshold (S1803: Y), the relocation processing program 604A determines a parity group which is a migration destination of this target page.

When determining the parity group which is the migration destination, the relocation processing program 604A refers to the parity-group-based relocation management table 503 and judges whether a parity group in which the number of migration-performed pages for the performance rebalance is less than the number of migration-planned pages for the performance rebalance exists in the write addition PG or not (S1804).

When the parity group in which the number of migration-performed pages for the performance rebalance is less than the number of migration-planned pages for the performance rebalance exists in the write addition PG (S1804: Y), the relocation processing program 604A: determines that a high load will be avoided even if the target page with a low read load is migrated to this parity group; and registers this parity group as a migration destination PG in the parity-group-based relocation management table 503 and migrates the target page to this parity group (S1805).

On the other hand, when the parity group in which the number of migration-performed pages for the performance rebalance is less than the number of migration-planned pages for the performance rebalance does not exist in the write addition PG (S1804: N), the relocation processing program 604A finishes the judgment on this target page and proceeds to step S1801.

Returning to step S1802, when the migration source PG type of the parity group to which the target page belongs is not the write reduction PG (S1802: N), that is, when the migration source PG type of the parity group to which the target page belongs is the write addition PG, the relocation processing program 604A refers to the read I/O counter row 703 of the page-based monitor table 501 and acquires the read frequency of this target page. Then, the relocation processing program 604A judges whether the acquired read frequency is equal to or more than the read reduction threshold or not (S1806).

When the read frequency of the target page is less than the read reduction threshold (S1806: N), the relocation processing program 604A proceeds to step S1801. On the other hand, when the read frequency of the target page is equal to or more than the read reduction threshold (S1806: Y), the relocation processing program 604A determines a parity group which is the migration destination of this target page.

Since the processing for determining the parity group which is the migration destination is the same as the processing in steps S1804 and S1805 described above, an explanation about it has been omitted. As a result of the above-described processing, the read load can be distributed and the service life can be leveled by relocating a page(s) between different parity groups composed of SSDs with the same property.

FIG. 19 illustrates a flowchart of new allocation determination processing. This new allocation determination processing is executed by the processor 114 and the new allocation determination processing program 605 in cooperation with each other as triggered by the receipt of a write request from the host 101 to write data to a new virtual page. For the purpose of illustration, the following explanation will be given by referring to the new allocation determination processing program 605 as the processing subject.

The new allocation determination processing program 605 firstly refers to the pool-based relocation management table 504 and judges whether the workload type of the pool 204 for providing a storage area to a target virtual volume 202 to which the new page is to be allocated is "Unknown" or not (S1901).

When the workload type of the pool 204 is not "Unknown" (S1901: N), the new allocation determination processing program 605 further judges whether the workload type of the pool 204 is "Write Intensive" or not (S1906). When the workload type is "Write Intensive" (1906: Y), the new allocation determination processing program 605: predicts that the write frequency with respect to the new page will be high; and sets an MLC PG whose upper limit number of writes is relatively high as an allocation destination parity group of a real page for the new page (S1907).

On the other hand, when the workload type is "Read Intensive" (S1906: N), the new allocation determination processing program 605: predicts that the write frequency with respect to the new page will be low; and sets a TLC PG whose upper limit number of writes is low as the allocation destination parity group of the real page for the new page (S1904).

Returning to step S1901, when the workload type is "Unknown" (S1901: Y), the new allocation determination processing program 605 is not aware of the I/O property from the host 101 and, therefore, predicts future write frequency with respect to the new page and determines the allocation destination. The new allocation determination processing program 605 firstly calculates predicted write frequency of the new page (S1902).

For example, the new allocation determination processing program 605 collects and estimates average write frequency per page from the host 101 as the monitor information, thereby calculating the predicted write frequency.

Next, the new allocation determination processing program 605 refers to the pool-based relocation management table 504 and judges whether the predicted write frequency is less than the new write threshold or not (S1903). When the predicted write frequency is less than the new write threshold (S1903: Y), the new allocation determination processing program 605 sets a TLC PG whose upper limit number of writes is low as the allocation destination parity group (S1904).

On the other hand, when the predicted write frequency is equal to or more than the new write threshold (S1903: N), the new allocation determination processing program 605 sets an MLC PG whose upper limit number of writes is high as the allocation destination parity group (S1907).

Subsequently, in order to judge whether the new page can be allocated or not with respect to the parity group with the property which is set as the allocation destination, the new allocation determination processing program 605 refers to the parity-group-based monitor table 502 and the paritygroup-based relocation management table 503 and judges whether the new writable amount is larger than the new write I/O counter or not, with respect to each parity group with the property which is set as the allocation destination (S1905).

When a parity group whose new writable amount is larger than the new write I/O counter exists (S1905: Y), the new allocation determination processing program 605 refers to the page-based monitor table 501 in order to allocate the new page from this parity group and sets a new write flag with respect to whichever page in this parity group (S1909), and then terminates this processing.

On the other hand, when a parity group whose new writable amount is larger than the new write I/O counter does not exist (S1905: N), the new allocation determination processing program 605 notifies the user of a recommended capacity because the new writable amount is in excess of newly permissible write frequency to maintain the service life (S1908).

Then, the new allocation determination processing program 605 sets the new write flag to whichever page in whichever parity group in order to allocate the new page from the judgment target parity group (S1909) and then terminates this processing.

As a result of the above-described processing, when a write request to write data to a new page is received from the host 101, a real page can be allocated to the new page from a parity group composed of SSDs according to the service life property in consideration of the write frequency with respect to the new page.

(1-7) Conceptual Configuration of Recommended Capacity Calculation Method

Figure 20:
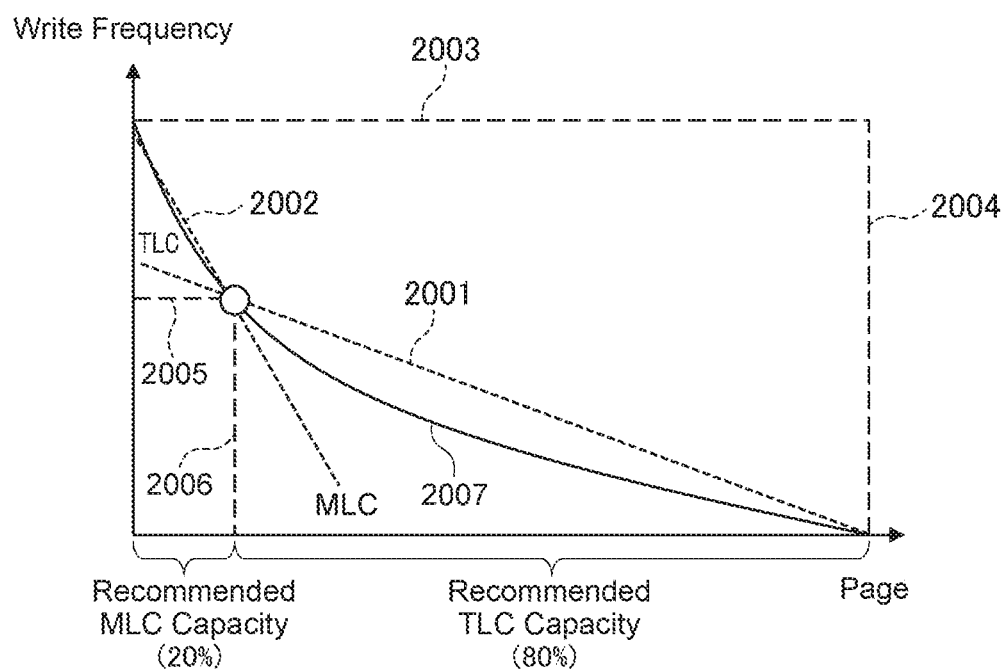
FIG. 20 is a conceptual diagram of a recommended capacity calculation method.

FIG. 20 illustrates the concept of how to calculate a capacity ratio of storage devices, whose recommended upper limit numbers of writes are different, in order to guarantee the service life with respect to the write frequency from the host 101. FIG. 20 illustrates distribution of the write frequency of each page 207 in the pool 204 (or each page 201 in the virtual volume 202). A graph 2007 represents the write frequency of each page 207 when all the pages 207 are aligned in descending order of the write frequency from the left. The vertical axis represents the write frequency and the horizontal axis represents the number of pages.

A TLC-MLC write threshold 2005 is a threshold for determining either the TLC PG or the MLC PG to locate a page and an intersection point of the TLC-MLC write threshold 2005 with the graph 2007 is a recommended capacity ratio (2006) of the TLC and the MLC. The TLC-MLC write threshold 2005 may be designated by the user or calculated by the storage system 104.

When the storage system 104 performs the calculation, the recommended capacity ratio can be calculated by calculation of Expression 9 below by using the client's required write frequency (=Whost), the pool 204 (or virtual volume 202) capacity (=C), and correlation graphs 2001, 2002 of permissible write frequency to guarantee the service life of each SSD.

In this example, the graph 2001 represents the correlation between the TLC SSD capacity and the permissible write frequency with the slope representing the permissible write frequency per unit capacity (=Wtlc) to guarantee the service life. Furthermore, the graph 2002 represents the correlation between the MLC SSD capacity and the permissible write frequency with the slope representing the permissible write frequency per unit capacity (=Wmlc) to guarantee the service life.

[Math. 9]

$$\text{Recommended TLC SSD Capacity} = ((((Wmlc \times C) - Whost) \div (Wmlc - Wtlc)) \div C)$$

$$\text{Recommended MLC SSD Capacity} = ((C - \text{Recommended TLC Capacity}) \div C) \quad (9)$$

As a result, the capacity ratio of the TLC SSD to the MLC SSD, which satisfies the client's required write frequency and the pool capacity, can be calculated.

(1-8) Screen Structure

Figure 21:
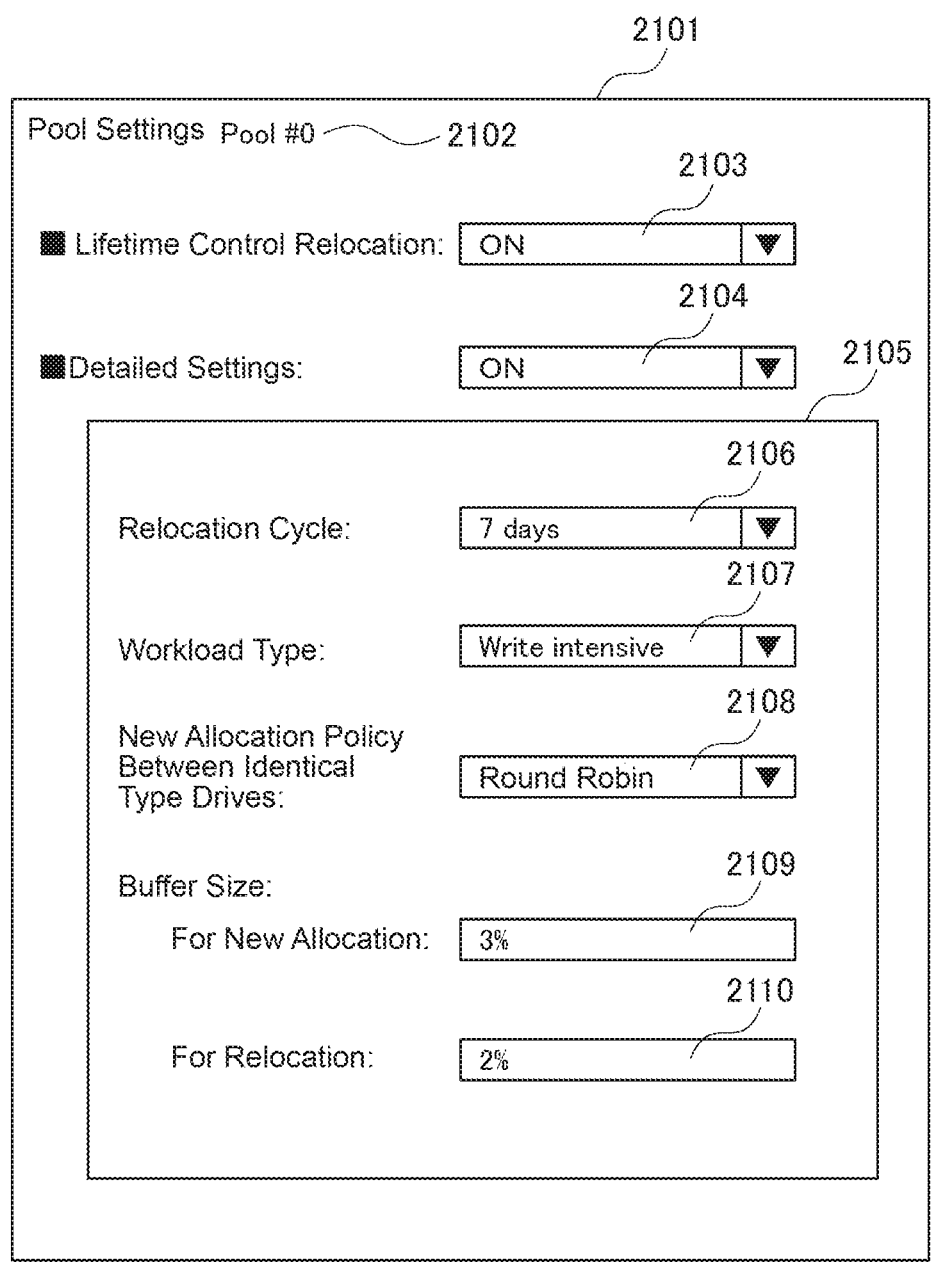
FIG. 21 is an example of a screen structure of a parameter setting screen.

FIG. 21 illustrates an example of a screen structure when setting parameters for each pool. A pool-based GUI screen 2101 is composed of: an area 2102 for displaying the pool number which can identify a target pool 204 to be set; an area 2103 for setting ON/OFF of the service life control relocation; an area 2104 for setting ON/OFF of the detailed settings when the service life control relocation is set to ON; and an area 2105 for setting the content of the detailed settings. Information which is set on this screen is stored in each row of the pool-based relocation management table 504.

When the setting of the service life control relocation area 2103 is OFF, the threshold determination processing program 604 does not execute the threshold determination processing. Therefore, the relocation processing program 604A does not execute the page relocation; however, the monitor information is collected regardless of whether the service life control relocation is ON or OFF in order to prevent accuracy degradation of the service life control.

When the setting of the service life control relocation area 2103 is ON, the page relocation is performed as explained above. In this case, the item setting area 2105 of the detailed settings area 2104 is displayed so that input can be made. When the detailed settings area 2104 is OFF, default values or values automatically calculated in the storage system 104 are set to various parameters of the item setting area 2105.

A relocation cycle area 2106 is to set a cycle for executing the relocation to control the service life. This cycle can be designated by the user. For example, if the user designates "7 days," the page relocation will be executed in a 7-day cycle.

A workload type area 2107 is to set the I/O property from the host 101. This I/O property can be designated by the user. When the I/O property from the host 101 is recognized in advance, the property of an SSD which is a new allocation destination can be explicitly designated by the user designating the I/O property.

Specifically speaking, when "Write Intensive" is designated, the I/O property of the host 101 is a high write load. So, a real page is allocated to the new page from the MLC PG whose upper limit number of writes is relatively large.

Furthermore, when "Read Intensive" is designated, the I/O property of the host 101 is a low write load. So, a real page is allocated to the new page from the TLC PG whose upper limit number of writes is small.

Furthermore, when the user is not aware of the I/O property of the host 101, the user designates "Unknown." In this case, the storage system 104 automatically determines an allocation destination parity group of the real page with respect to the new page.

A new-allocation-policy-between-identical-type-drives area 2108 is to set a policy to determine from which parity group with whichever property, either the TLC PG or the MLC PG, a page should be allocated when allocating a real page to the new page.

For example, when the user designates "Round Robin," pages are allocated equally from each parity group. Moreover, when "Priority on Capacity" is designated, allocation of pages from a parity group with a small capacity is prioritized. Furthermore, when "Priority on Service life" is designated, allocation of pages from a parity group with long service life is prioritized.

Buffer size areas 2109 and 2110 are to set buffer ratios to the capacity of the parity group whose property is the MLC PG. The new allocation area 2109 is to set a buffer used to allocate a new page from the parity group whose property is the MLC PG. It has the effect of preventing a page with a high write load, which should be allocated from the MLC PG, from being allocated from the TLC PG due to an insufficient remaining capacity of the MLC PG at the time of the new allocation.

The new allocation buffer is newly allocated for every relocation cycle. Therefore, an optimum size of the new allocation buffer can be estimated on the basis of a data amount which is estimated to be written in a cycle to the new page from the host 101.

The relocation buffer area 2110 is to set a buffer used to relocate a page(s). The relocation buffer adjusts the data size which can be migrated per unit time at the time of relocation. Therefore, setting a larger size of the relocation buffer has the effect of increasing the throughput at the time of relocation.

Figure 22:
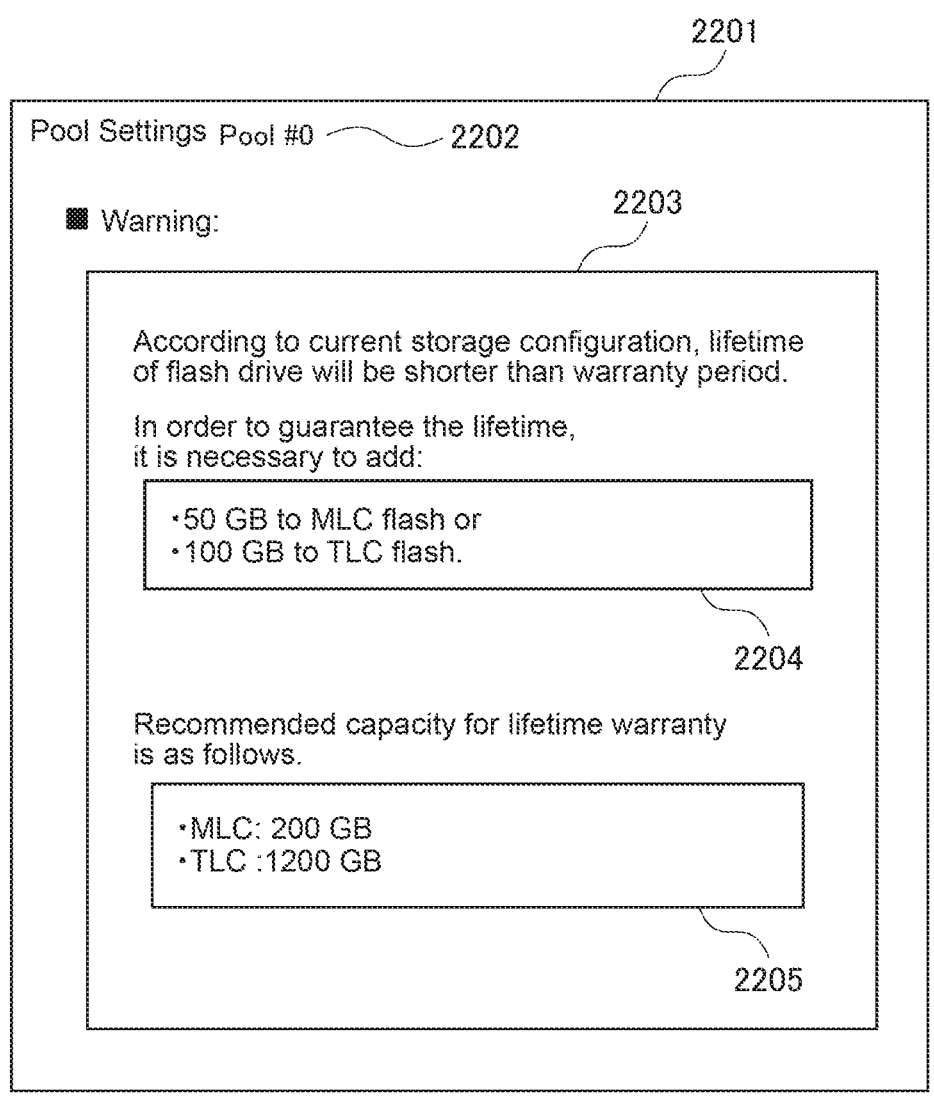
FIG. 22 is an example of a screen structure of a warning screen.

FIG. 22 illustrates an example of the screen structure of a warning screen for the storage system 104 to notify the user of a warning. The warning screen can notify the user that the write frequency from the host 101 is high and the current configuration will make the service life of the SSDs shorter than a target period or the SSDs are mounted excessively to guarantee the service life.

Regarding the timing to trigger displaying of the screen, the storage system 104 may automatically display the screen after the completion of the page relocation processing which is executed periodically, or the user may perform some operation on the storage system 104 to display the screen at arbitrary timing. In the latter case, the recommended capacity is calculated based on the monitor information at the timing when arbitrary operation is performed.

A pool-based GUI screen 2201 is composed of: an area 2202 for displaying the pool number capable of identifying a target pool 204 to be set; and an area 2203 for reporting the content of the warning. The area 2203 for reporting the content of the warning is composed of: an area 204 for reporting the TLC or MLC capacity which can be added to, or reduced from, the current drive configuration; and an area 2205 for reporting a recommended MLC and TLC capacity based on the information of the I/O request from the current host 101. Incidentally, the reported capacity information may be expressed with a ratio of the TLC capacity to the MLC capacity.

(1-9) Advantageous Effects of First Embodiment

With the storage system 104 according to the first embodiment as described above, the write frequency can be adjusted between parity groups composed of SSDs with different service lifes by relocating pages between the TLC and the MLC. Furthermore, the write frequency can be adjusted between parity groups composed of SSDs with the same property by executing the write rebalance processing. Therefore, the number of times the SSDs are replaced for maintenance can be reduced by migrating pages with the write frequency to an SSD whose service life degradation is severe to an SSD whose service life degradation is moderate. Also, the cost of the storage system 104 can be reduced.

(2) Second Embodiment

A second embodiment is different from the first embodiment as the second embodiment is designed such that with a storage system equipped with not only semiconductor memories (SSDs), but also hard disk drives (HDDs) as storage devices, the storage devices (SSDs and HDDs) are classified into tiers according to their performance and tier control is performed to locate data in the storage devices of appropriate tiers according to access frequency from the host.

(2-1) Overall Configuration of Computer System

Figure 23:
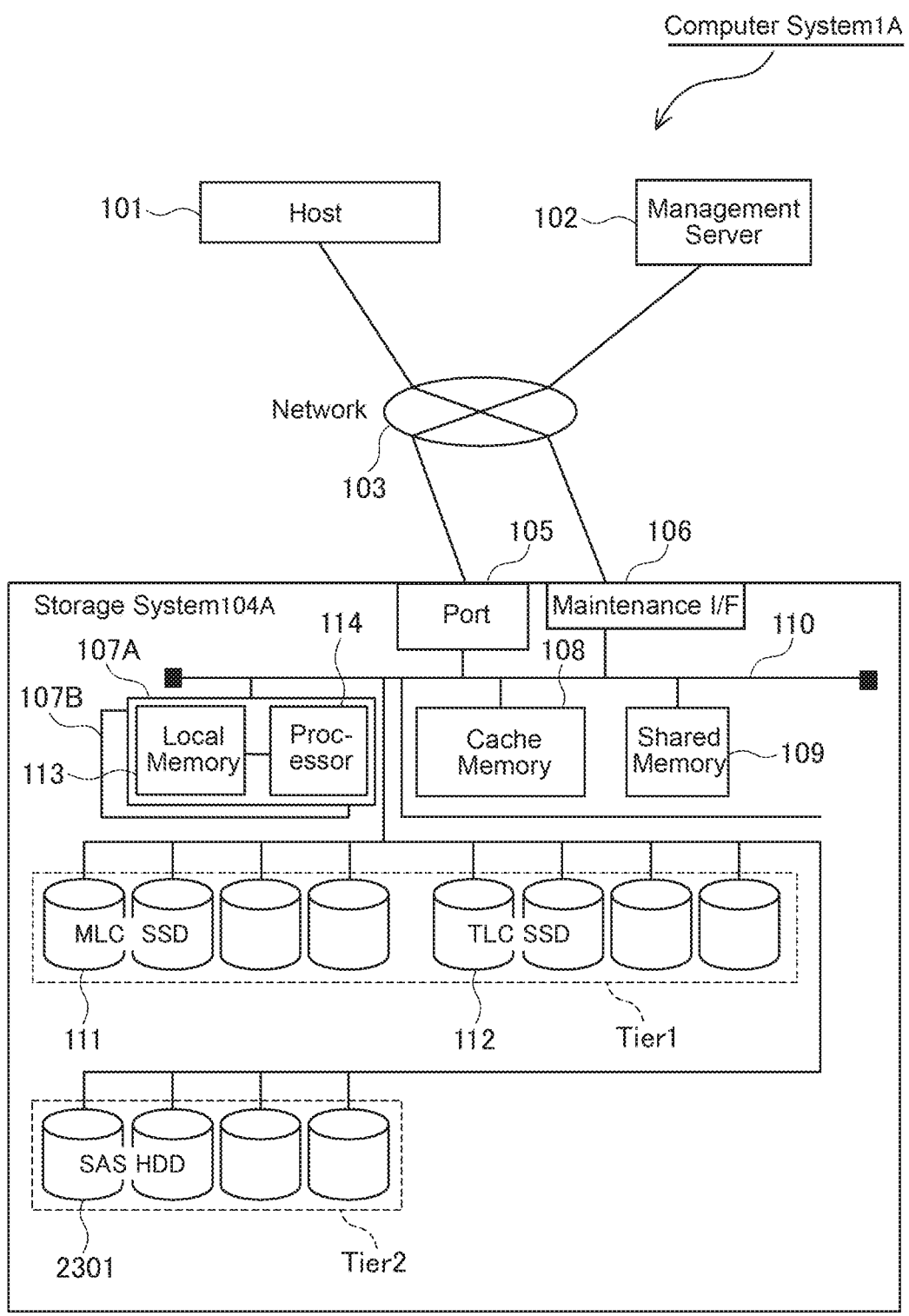
FIG. 23 is an overall configuration diagram of a computer system according to a second embodiment.

FIG. 23 illustrates an overall configuration of a computer system 1A according to the second embodiment. The computer system 1A is different from the first embodiment as it is designed such that: HHDs (drives 2301) according to SAS (Serial Attached SCSI) standards are mounted; and SSDs (the drives 111 and 112) are set as Tier 1, the HDDs according to the SAS standards (the drives 2301) are set as Tier 2, and data are relocated between the tiers according to I/O frequency of each page.

For example, let us assume that settings are made to allocate a page with the I/O frequency of 100 [IOPS] from Tier 1 and allocate a page with the I/O frequency of 10 [IOPS] from Tier 2. On the other hand, let us assume that a page with the I/O frequency of 50 [IOPS] is allocated from Tier 2 and a page with the I/O frequency of 20 [IOPS] is allocated from Tier 1.

In this case, the storage system 104A can exhibit the performance of only 10 (upper limit IOPH of Tier 2)+20=30 [IOPS] as a whole. So, if the page with the I/O frequency of 50 [IOPH] is migrated (or relocated) from Tier 2 to Tier 1, the storage system 104A will be able to exhibit the performance of 50+20=70 [IOPS] as a whole.

(2-2) Logical Configuration of Storage System

Figure 24:
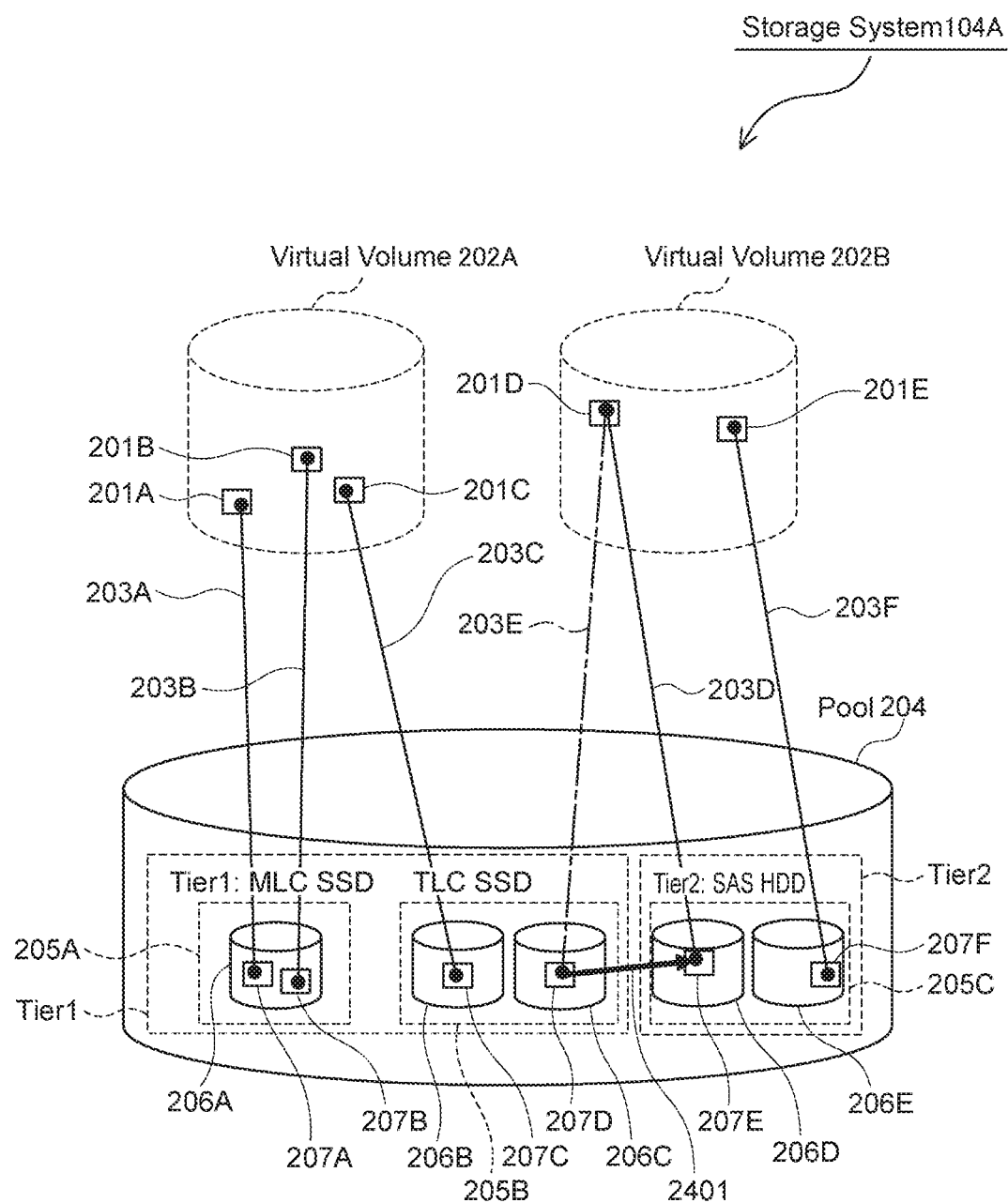
FIG. 24 is a logical configuration diagram of a storage system.

FIG. 24 illustrates a logical configuration of the storage system 104A. The storage system 104A is different from the first embodiment as it is configured so that pool volumes 206A to 206C are composed of MLC SSDs or TLC SSDs and pool volumes 206D and 206E are composed of SAS HDDs, and each pool volume 206A to 206E is classified into Tier 1 or 2.

Then, in addition to the page relocation explained in the first embodiment, the storage system 104A according to the second embodiment executes write demotion processing for migrating, for example, the page 207D with a high write load to Tier 2 when the write load from the host 101 becomes high in Tier 1 composed of the SSDs and the service life of the SSDs can no longer be guaranteed. As a result, it is possible to prevent the service life degradation of the SSDs.

(2-3) Conceptual Configuration of Page Location Processing

Figure 25:
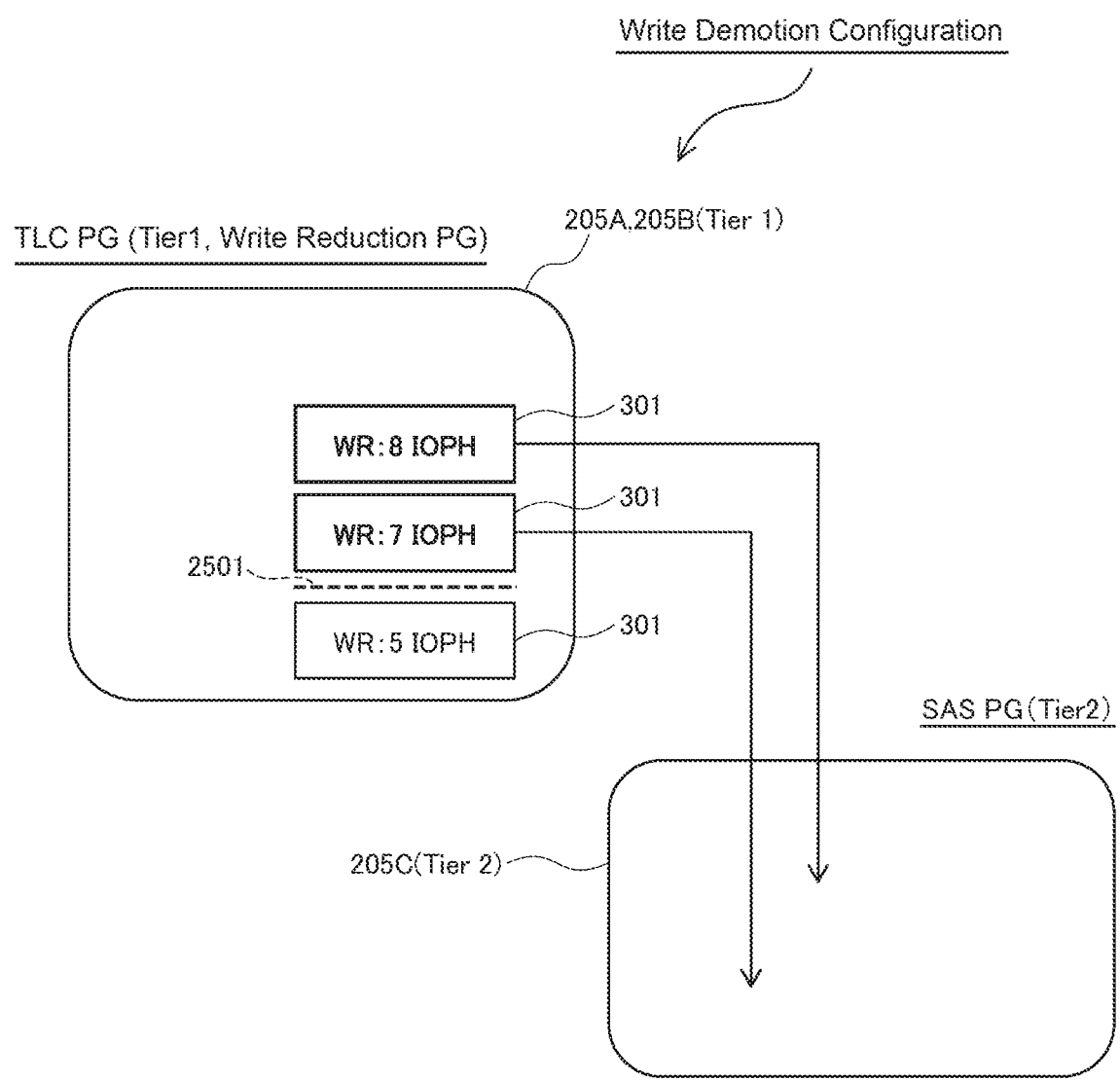
FIG. 25 is a conceptual configuration diagram of page relocation processing by write demotion processing.

FIG. 25 illustrates a conceptual configuration of page relocation processing by the write demotion processing. In this example, pages 301 are relocated between Tier 1 composed of the MLC PG 205A or the TLC PG 205B and Tier 2 composed of the parity group composed of the SAS HDD (hereinafter referred to as the SAS PG) 205C. The write demotion processing is executed when it is judged that the service life of the SSD cannot be maintained only by the page relocation within Tier 1 during the threshold determination processing.

Specifically speaking, when the migration of sufficient pages to satisfy the required write reduction amount of the write reduction PG has failed after calculating the number of migration-planned pages by the write rebalance during the threshold determination processing, the number of migration-planned pages by the write demotion processing is calculated based on the write frequency of the migration-failed amount of pages. Then, when executing the write rebalance, as many pages with the write frequency equal to or more than a write demotion threshold 2501 as the number of migration-planned pages by the write demotion processing are migrated from the MLC PG 205A or the TLC PG 205B to the SAS PG 205C.

(2-4) Table Structure

FIG. 26 illustrates a logical configuration of a parity-group-based relocation management table 503A according to the second embodiment. In addition to each row of the parity-group-based relocation management table 503 (FIG. 9), the parity-group-based relocation management table 503A includes a write demotion threshold row 2601, a number-of-migration-planned-pages row 2602 for the write demotion, a number-of-migration-performed-pages row 2603 for the write demotion, and a tier level row 2604.

The write demotion threshold row 2601 stores a threshold for determining a target page of the write demotion processing; and the number-of-migration-planned-pages row 2602 for the write demotion stores the number of pages to be migrated by the write demotion processing. Moreover, the number-of-migration-performed-pages row 2603 for the write demotion stores the number of pages migrated by the write demotion processing. The tier level row 2604 stores the order of tiers to which the parity group belongs (for example, Tier 1, Tier 2, and Tier 3). Incidentally, in this example, a smaller value of the tier order is composed of high-performance drives.

FIG. 27 illustrates a logical configuration of a pool-based relocation management table 504A according to the second embodiment. In addition to each row of the pool-based relocation management table 504 (FIG. 10), the pool-based relocation management table 504A includes an inter-tier I/O threshold row 2701. The inter-tier I/O threshold row 2701 stores a threshold for determining to which tier the relevant page should be located.

(2-5) Flowcharts

Figure 28:
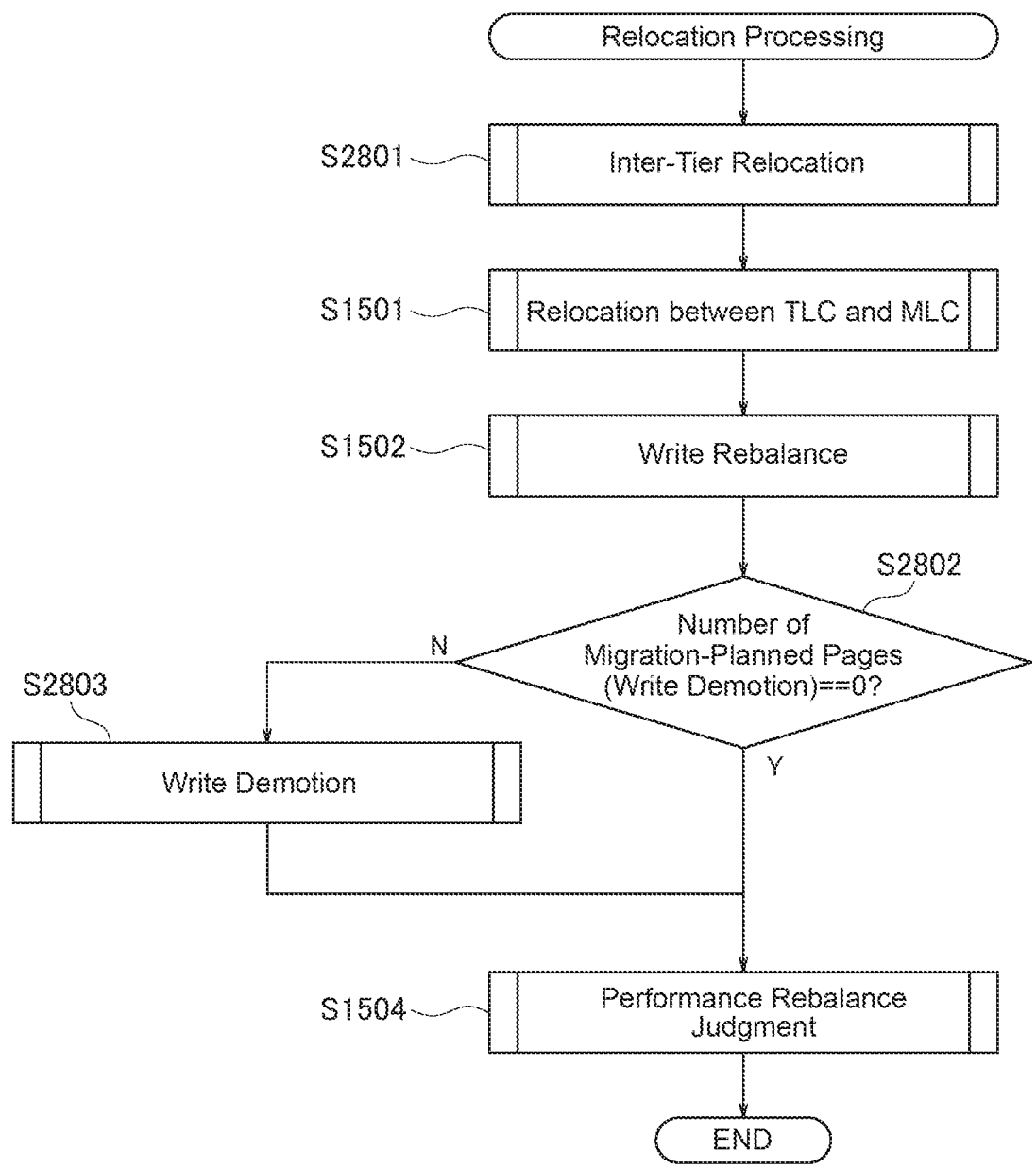
FIG. 28 is a flowchart of relocation processing.

FIG. 28 illustrates a flowchart of relocation processing according to the second embodiment. This relocation processing is executed by the processor 114 and the relocation processing program 604A, which is invoked by the threshold determination processing program 604, in cooperation with each other. For the purpose of illustration, the following explanation will be given by referring to the relocation processing program 604A as the processing subject.

Incidentally, it is assumed as a premise that the threshold determination processing program 604 calculates the inter-tier I/O threshold and the number of migration-planned pages for the write demotion during the threshold determination processing (FIG. 14) and stores various thresholds in the parity-group-based relocation management table 503A and the pool-based relocation management table 504A, respectively.

The relocation processing program 604A firstly executes inter-tier relocation processing (S2801). When this happens, the relocation processing program 604A refers to the inter-tier I/O threshold row 2701 of the pool-based relocation management table 504A and determines a tier to locate the target page.

Subsequently, the relocation processing program 604A executes the TLC-MLC relocation processing in the same manner as the relocation processing (FIG. 15) according to the first embodiment (S1501) and then executes the write rebalance processing (S1502). After executing the write rebalance processing, the relocation processing program 604A refers to the parity-group-based relocation management table 503A and judges whether the number of migration-planned pages for the write demotion is 0 or not (S2802).

When the number of migration-planned pages for the write demotion is not 0 (S2802: N), this means that adjustment of the write frequency was not enough only by executing the write rebalance processing, so that the relocation processing program 604A executes the write demotion processing (S2803). Subsequently, the relocation processing program 604A executes the performance rebalance (S1504) and then terminates this processing.

On the other hand, when the number of migration-planned pages for the write demotion is 0 (S2802: Y), the relocation processing program 604A does not have to execute the write demotion processing and, therefore, executes the performance rebalance (S1504) and then terminates this processing. As a result of the above-described processing, when the write frequency from the host 101 is excessive and the service life of the SSD constituting Tier 1 cannot be maintained, the service life of the SSD in Tier 1 can be maintained by migrating a page(s) with a high write load to Tier 2.

Figure 29:
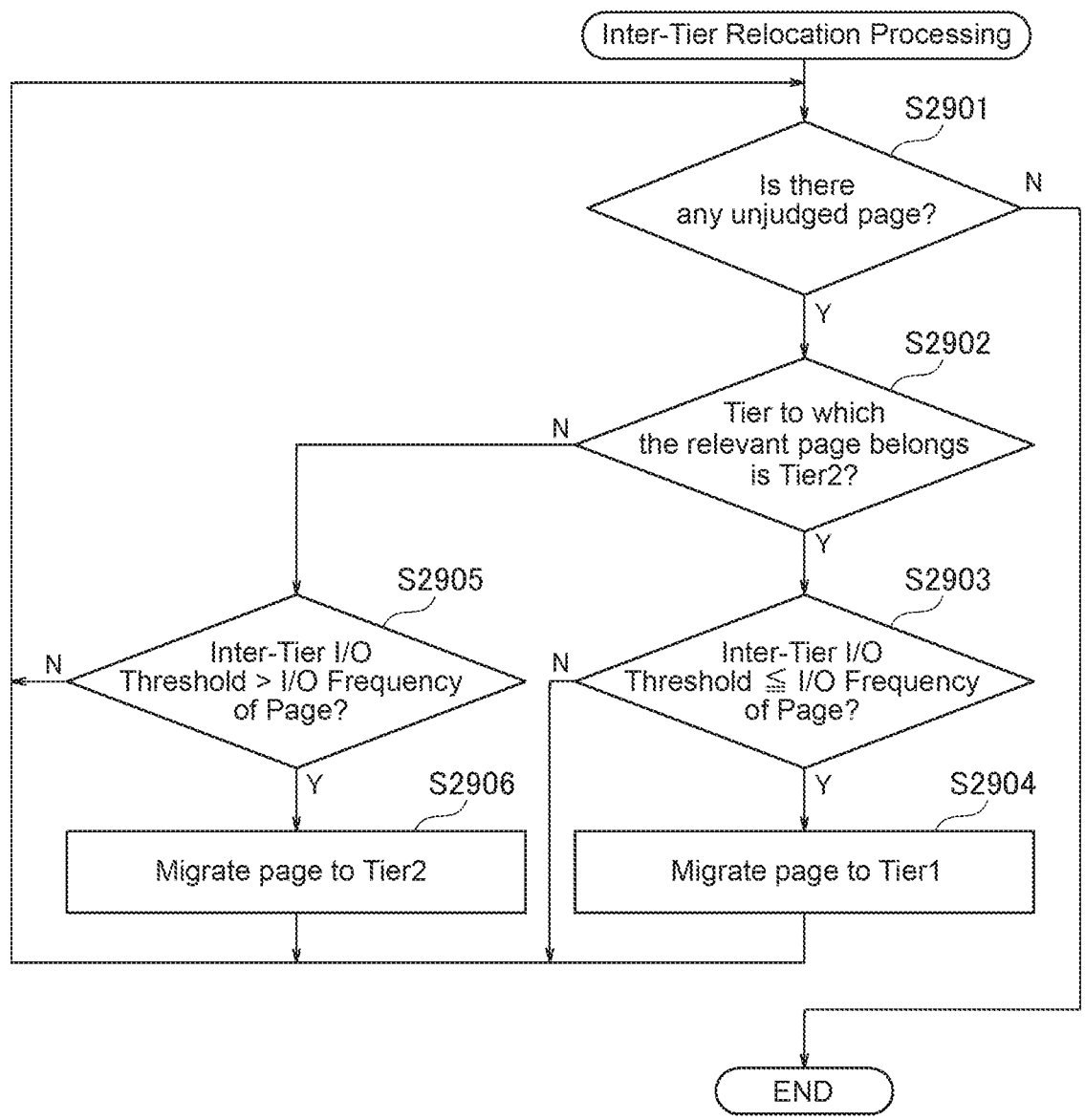
FIG. 29 is a flowchart of inter-tier relocation processing.

FIG. 29 illustrates a flowchart of inter-tier relocation processing. This inter-tier relocation processing is executed by the processor 114 and the relocation processing program 604A in cooperation with each other. For the purpose of illustration, the following explanation will be given by referring to the relocation processing program 604A as the processing subject.

The relocation processing program 604A firstly relocates each page in all the parity groups to Tier 1 or 2 on the basis of the inter-tier I/O threshold calculated by the threshold determination processing program 604. When this happens, the relocation processing program 604A judges whether or not there is any unjudged page for which the relocation has not been judged (S2901).

When there is an unjudged page (S2901: Y), the relocation processing program 604 refers to the parity-group-based relocation management table 503A and judges whether a tier to which this unjudged target page belongs is Tier 2 or not (S2902).

When the tier to which this target page belongs is Tier 2 (S2902: Y), the relocation processing program 604A refers to the pool-based relocation management table 504A and judges whether the I/O frequency of the target page is equal to or more than the inter-tier I/O threshold or not (S2903).

When the I/O frequency of the target page is equal to or more than the inter-tier I/O threshold (S2903: Y), the relocation processing program 604A migrates the target page from Tier 2 to Tier 1 (S2904). On the other hand, when the I/O frequency of the target page is less than the inter-tier I/O frequency (S2903: N), the relocation processing program 604A performs nothing and proceeds to step S2901.

Returning to step S2902, when the tier to which the target page belongs is Tier 1 (S2902: N), the relocation processing program 604A refers to the pool-based relocation management table 504A and judges whether the I/O frequency of the target page is less than the inter-tier I/O threshold or not (S2905).

When the I/O frequency of the target page is less than the inter-tier I/O threshold (S2905: Y), the relocation processing program 604A migrates the target page from Tier 1 to Tier 2 (S2906). On the other hand, when the I/O frequency of the target page is equal to or more than the inter-tier I/O frequency (S2905: N), the relocation processing program 604A performs nothing and proceeds to step S2901.

When the relocation processing program 604A finishes judging each page within all the parity groups, it terminates this processing. As a result of the above-described processing, a page(s) can be relocated to each tier according to the I/O frequency from the host 101 and the performance of each tier.

Figure 30:
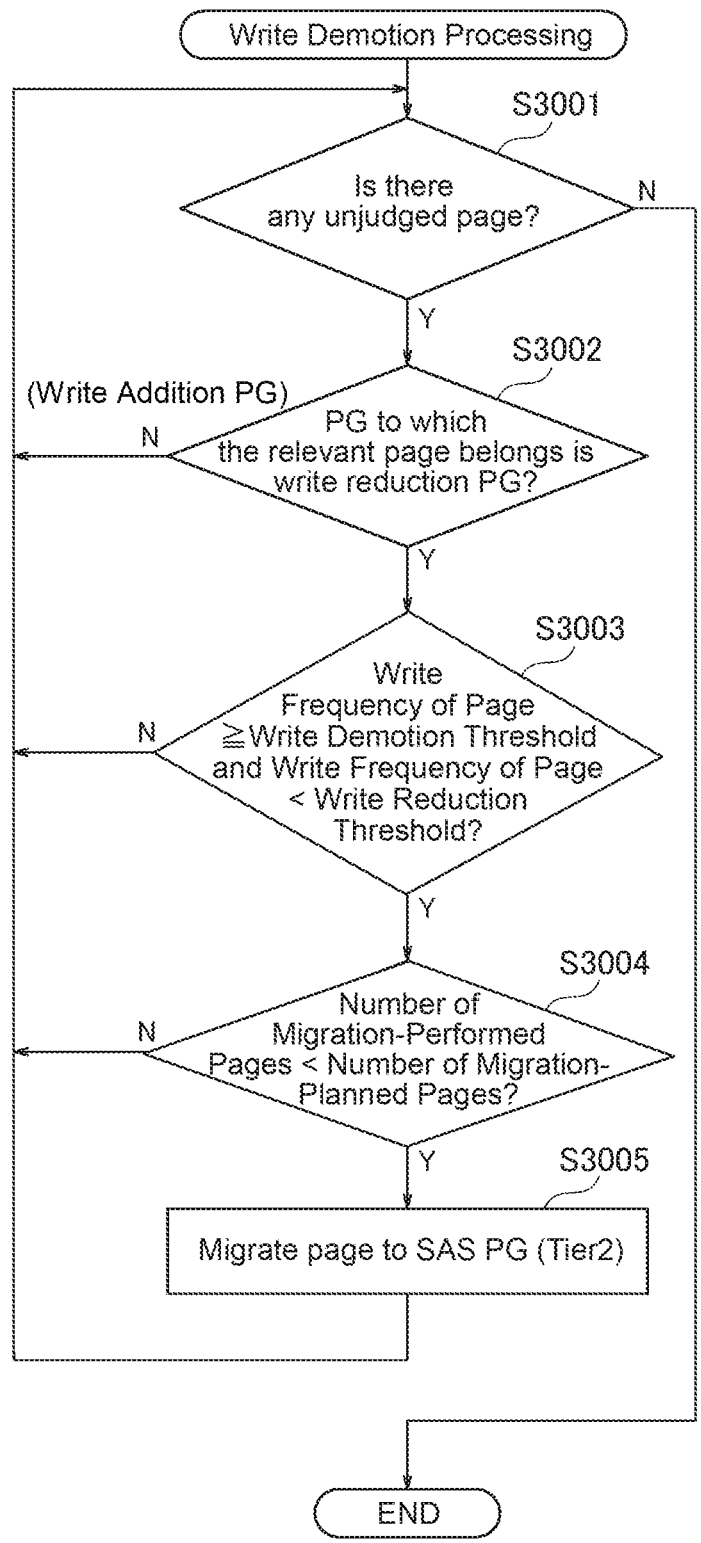
FIG. 30 is a flowchart of write demotion processing.

FIG. 30 illustrates a flowchart of the write demotion processing. This write demotion processing is executed by the processor 114 and the relocation processing program 604A in cooperation with each other. For the purpose of illustration, the following explanation will be given by referring to the relocation processing program 604A as the processing subject.

The relocation processing program 604A firstly relocates a page(s) between different tiers on the basis of the number of migration-planned pages for the write demotion, the write reduction threshold, and the write demotion threshold which are calculated by the threshold determination processing program 604. When this happens, the relocation processing program 604A judges whether or not there is any unjudged page for which the relocation has not been judged (S3001).

When there is no unjudged page (S3001: N), the relocation processing program 604A terminates this processing. On the other hand, when there is an unjudged page (S3001: Y), the relocation processing program 604A refers to the parity-group-based relocation management table 503A and judges whether the migration source PG type of a parity group to which this unjudged target page belongs is the write reduction PG or not (S3002).

When the migration source PG type of the parity group to which the target page belongs is not the write reduction PG (S3002: N), that is, when the migration source PG type is the write addition PG, the relocation processing program 604A: determines that it is unnecessary to execute the write demotion processing on the target page; and proceeds to step S3001.

On the other hand, when the migration source PG type of the parity group to which the target page belongs is the write reduction PG (S3002: Y), the relocation processing program 604A refers to the write I/O counter row 702 of the page-based monitor table 501 and acquires the write frequency of this target page.

Then, the relocation processing program 604A refers to the write reduction threshold row 905 and the write demotion threshold row 2601 of the parity-group-based relocation management table 503A and acquires the write reduction threshold and the write demotion threshold.

Then, the relocation processing program 604A judges whether or not the acquired write frequency of the target page is equal to or more than the write demotion threshold and is less than the write reduction threshold (S3003). When the write frequency of the target page is equal to or more than the write demotion threshold and is not less than the write reduction threshold (S3003: N), the relocation processing program 604A proceeds to step S3001.

On the other hand, when the write frequency of the target page is equal to or more than the write demotion threshold and is less than the write reduction threshold (S3003: Y), the relocation processing program 604A judges whether or not the number of migration-performed pages for the write demotion of the parity group to which the target page belongs is less than the number of migration-planned pages for the write demotion (S3004).

When the number of migration-performed pages for the write demotion of the parity group to which the target page belongs is not less than the number of migration-planned pages for the write demotion (S3004: N), the relocation processing program 604A proceeds to step S3001.

On the other hand, when the number of migration-performed pages for the write demotion of the parity group to which the target page belongs is less than the number of migration-planned pages for the write demotion (S3004: Y), the relocation processing program 604A migrates the target page from Tier 1 to Tier 2 (S3005). When the relocation processing program 604A finishes judging all the unjudged pages, it terminates this processing.

Figure 31:
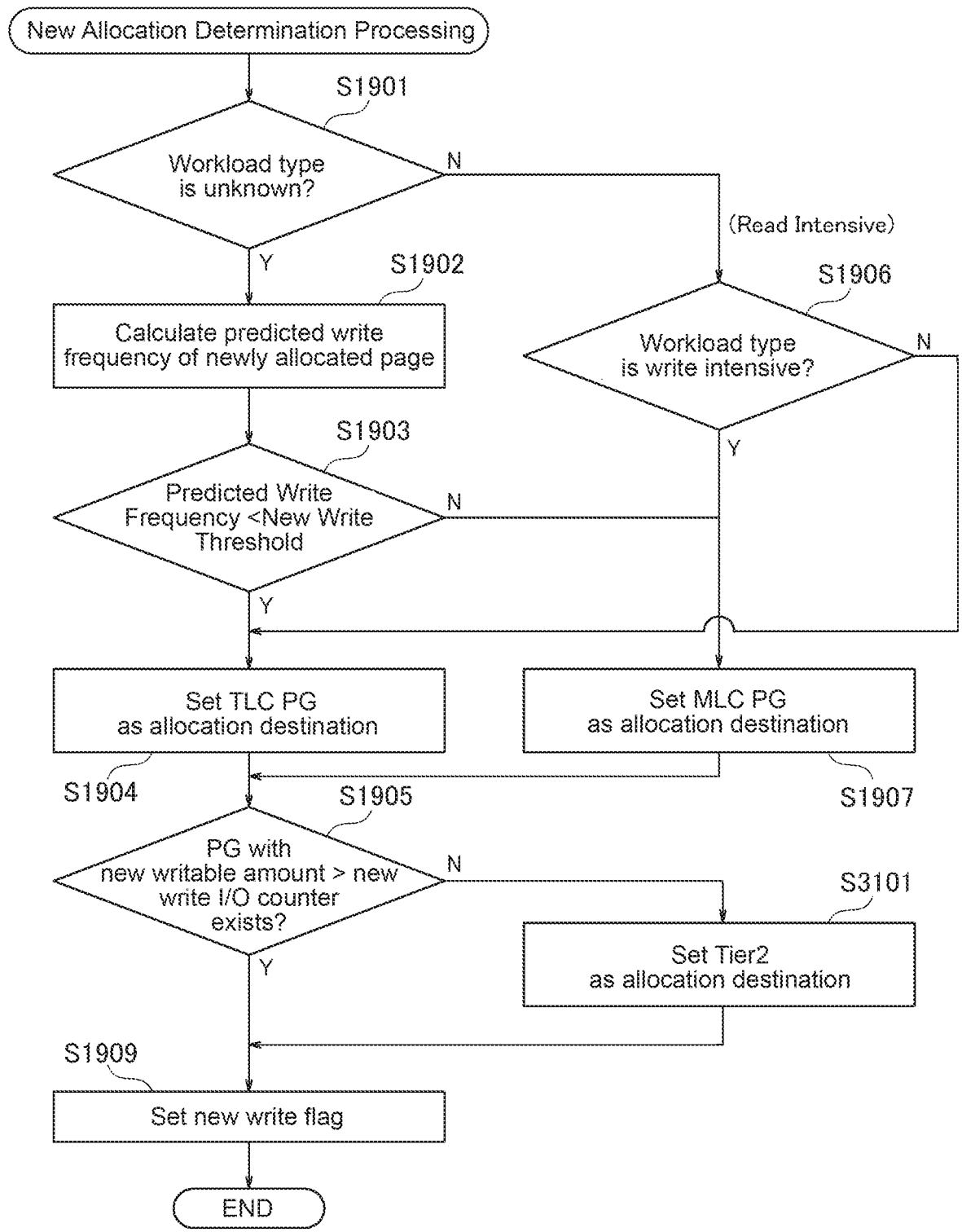
FIG. 31 is a flowchart of new allocation determination processing.

FIG. 31 illustrates a flowchart of new allocation determination processing. This new allocation determination processing is executed by the processor 114 and the new allocation determination processing program 605 in cooperation with each other as triggered by the receipt of a write request for a new page from the host 101. For the purpose of illustration, the following explanation will be given by referring to the new allocation determination processing program 605 as the processing subject.

Since processing from steps S1901 to S1905 is the same as the new allocation determination processing (FIG. 19) according to the first embodiment, an explanation about it has been omitted here. In step S1905, the new allocation determination processing program 605 judges whether the new writable amount is larger than the new write I/O counter or not, with respect to a parity group of Tier 1 with the property which is set for an allocation destination (S1905).

When the parity group whose new writable amount is larger than the new write I/O counter does not exist (S1905: N), the relocation processing program 604A: determines that if any more pages are allocated from Tier 1, the service life of the SSD can no longer be maintained; and sets Tier 2 as the allocation destination of a real page for the new page (S3101).

Since step S1909 is the same as the new allocation determination processing (FIG. 19) according to the first embodiment, an explanation about it has been omitted. As a result of the above-described processing, a necessary amount of the write frequency can be reduced from Tier 1 in order to maintain the service life. Incidentally, when the write request from the host 101 at the time of new allocation is "sequential write," a page(s) may be allocated from Tier 2 without executing the new allocation determination processing program.

(2-6) Advantageous Effects of Second Embodiment

With the storage system 104A according to the second embodiment as described above, the service life degradation of the SSD in excess of permissible write frequency during a certain period can be made moderate by migrating the write frequency from the host 101 to Tier 1 to Tier 2.

Therefore, the number of times the SSD is replaced for maintenance can be reduced and the cost of the storage system 104A can be reduced.

(3) Third Embodiment

In a third embodiment, an explanation will be given about a method for calculating the possible write addition amount and the required write reduction amount (FIG. 8) which are explained in the first embodiment. In the first embodiment, the possible write addition rate and the required write reduction rate are collected from the SSDs and Expressions 1 and 2 mentioned earlier are calculated by using them, thereby calculating the possible write addition amount and the required write reduction amount; however, when the possible write addition rate and the required write reduction rate cannot be directly collected from the SSDs, the possible write addition amount and the required write reduction amount can be calculated by using the method described below.

Figure 32:
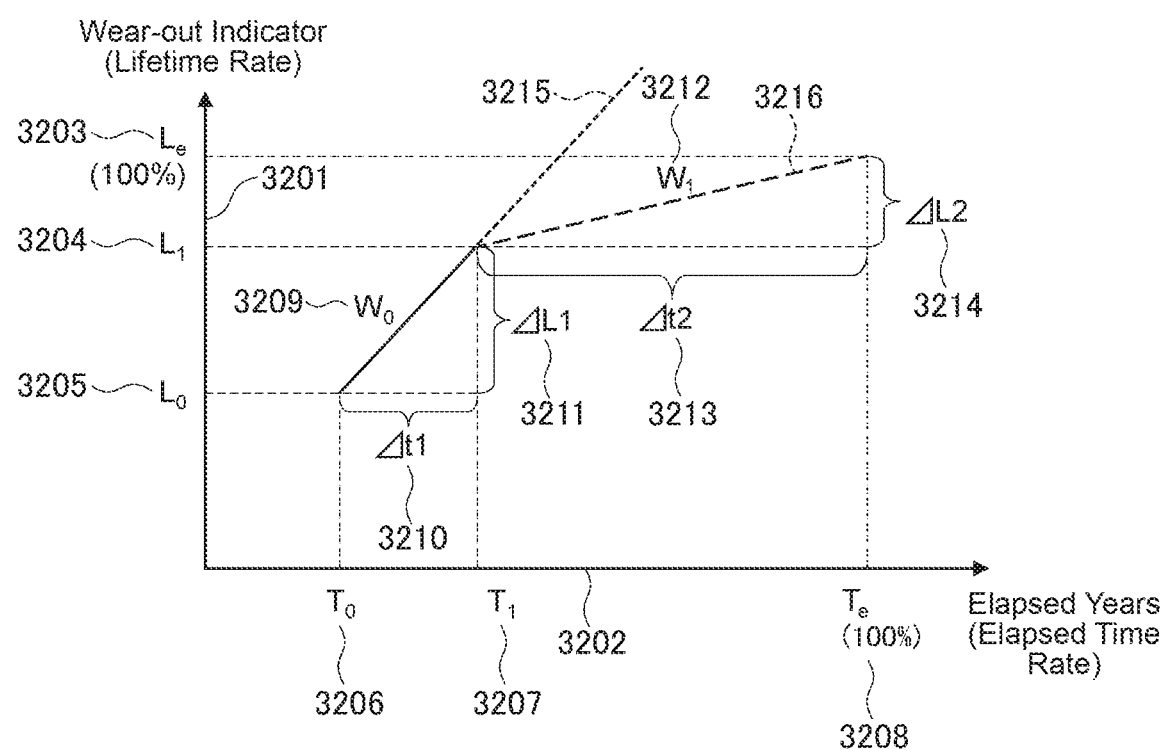
FIG. 32 is a conceptual diagram of a method for calculating a possible write addition amount and a required write reduction amount.

FIG. 32 illustrates the concept of how to acquire a wear-out indicator as service life information of the SSD and calculate the possible write addition amount and the required write reduction amount from the wear-out indicator. The vertical axis of a graph represents the wear-out indicator (service life rate) 3201 of the SDD and the horizontal axis represents elapsed years (elapsed time rate) 3202 since the start of using the SSD.

The service life rate 3201 means the wear-out indicator calculated from the number of times of SSD deletions and it is known that the service life rate 3201 can be acquired generally as S.M.A.R.T. information. The wear-out indicator means the service life of the SSD when its value reaches 100 ($=L_e$); and replacement for maintenance becomes necessary. The elapsed time rate means a rate of elapsed time where a target service life period (for example, three years or five years) is set as 100% ($=T_e$).

A straight line 3215 represents a change of the service life rate $\Delta L1(=L_1-L_0)$ during a section $\Delta t1(=T_1-T_0)$ and a slope of the straight line represents the write frequency ($=W_0$) of the section $\Delta t1$. When the write frequency of the straight line 3215 continues, the service life of the SSD will end before reaching the target service life period.

Therefore, the write frequency is reduced to the write frequency ($=W_1$) indicated by a straight line 3216 and the speed of service life degradation is adjusted so that an increase amount of the service life rate during a section $\Delta t2(=T_e-T_1)$ becomes $\Delta L(=L_e-L_1)$. Furthermore, regarding the write frequency to the SSD, it is generally known that the number of writes to a flash chip inside the SSD becomes larger than the number of times the host 101 issues write requests to the SSD because of WA (Write Amplification). A WA value of the SSD is calculated as (the number of writes to the flash chip÷ the number of times the write requests are issued from the host 101).

The storage system 104 calculates the required write reduction amount which is required to maintain the service life, by using the above-described numerical values. The required write reduction amount can be calculated by calculation of Expression 10 below.

[Math. 10]

$$\text{Required Write Reduction Amount [IOPH]}=W_0 \times WA \times (1-((\Delta t1 \div \Delta L1) \times (\Delta L2 \div \Delta t2))) \quad (10)$$

Furthermore, when the write frequency is sufficient to achieve the target service life period, the storage system 104 calculates the possible write addition amount. The possible write addition amount can be calculated by calculation of Expression 11 below.

[Math. 11]

$$\text{Possible Write Addition Amount [IOPH]}=W_0 \times WA \times (((\Delta t1 \div \Delta L1) \times (\Delta L2 \div \Delta t2))-1) \quad (11)$$

As a result, the possible write addition amount and the required write reduction amount (FIG. 8) with respect to the SSD PG can be calculated from the SSD service life information which can be generally acquired. Then, the cost of the storage system 104 can be reduced by relocating a page(s) on the basis of the possible write addition amount and the required write reduction amount which have been calculated.

Incidentally, the above-explained embodiments have described the configuration whereby the service life of the SSD whose upper limit number of writes is small is extended by relocating a page(s) so as to reduce the number of writes to the SSD whose upper limit number of "writes" is small; however, the service life of an SSD whose upper limit number of "rewrites" is small can also be extended in the same manner by adopting the above-described configuration. Rewriting the SSD means a series of processing for deleting a block composed of a plurality of pages once and then writing data to each page in the block. So, if rewriting is performed once, both deletion and writing are performed. In other words, the service life of the SSD whose upper limit number of rewrites is small can be extended by treating the SSD whose upper limit number of rewrites is small in the same manner as the SSD whose upper limit number of writes is small.

Furthermore, the above-explained embodiments have described the configuration whereby the service life of the SSD whose upper limit number of writes is small is extended by relocating a page(s) so as to reduce the "write frequency" (the number of writes) of the SSD whose upper limit number of writes is small; however, the service life of the SSD whose upper limit number of writes is small can be also extended in the same manner by relocating a page(s) so as to reduce a "data amount" to be written. This is because when the data amount to be written is large, it is necessary to write data to a plurality of pages and, therefore, the number of writes increases.

REFERENCE SIGNS LIST

1, 1A: computer system
104, 104A: storage system
114: processor
111: MLC SSD
112: TLC SSD
2301: SAS HDD
202: virtual volume
201, 301, 401, 207: pages
206: pool volume
205: parity group
302: TLC-MLC write threshold

The invention claimed is:
1. A storage system, comprising:
a plurality of semiconductor storage devices that store data; and
a processor that allocates storage areas from a pool based on the plurality of semiconductor storage devices to a virtual volume, wherein the plurality of semiconductor storage devices include a plurality of types of semiconductor storage devices having a different upper limit number of writes and a storage capacity per cell, and a semiconductor storage device, with a large storage capacity per cell, has a small upper limit number of writes and a low cost per storage capacity, and wherein the processor records a write frequency for each storage area of the virtual volume, wherein the processor changes the type of the semiconductor storage device to be allocated to a storage area based on the write frequency of the storage area of the virtual volume, wherein, in changing the type of the semiconductor storage device, the processor allocates a storage area with a high write frequency to a semiconductor storage device of a type with a large upper limit number of writes and allocates a storage area with a low write frequency to a semiconductor storage device of a type with a small upper limit number of writes, and wherein the processor calculates information for each recommended type of the storage capacity for the semiconductor storage device being the basis of the pool allocated to the storage areas based on:

the capacity of the pool or the virtual volume;

the assumed write frequency to the pool or the virtual volume; and the permissible write frequency for each type of the semiconductor storage device per unit capacity.

2. The storage system according to claim 1, wherein the information for each type of the semiconductor storage device being the basis of the pool allocated to the storage areas is a ratio which meets:

a ratio of a capacity of storage areas based on the semiconductor storage device of each of the type among the capacity of the pool or the virtual volume; and a recommended ratio of guaranteeing a service life of the semiconductor storage device during an assumed period.

3. The storage system according to claim 1, wherein the storage capacity of each recommended type of the semiconductor storage device being the basis of the pool allocated to the storage areas is a capacity of each type of the semiconductor storage device reducing operation management cost of the storage system when the semiconductor storage device is replaced based on the number of writes and the upper limit number of writes to the semiconductor storage device.

4. The storage system according to claim 3, wherein an assumed period is set for the semiconductor storage device for use, and wherein, when there is a shortfall in the quantity of semiconductor storage devices for use during the assumed period, the shortfall of the semiconductor storage devices is notified.

5. The storage system according to claim 1 wherein the storage area with a higher write frequency than a predetermined threshold is allocated and moved from the semiconductor storage device of a type with a small upper limit number of writes to the semiconductor storage device of a type with a large upper limit number of writes, and wherein the predetermined threshold is changed based on a write frequency to the semiconductor storage device of a type with a small upper limit number of writes.

6. A control method for a storage system including a plurality of semiconductor storage devices that store data, comprising:

allocating storage areas from a pool based on the plurality of semiconductor storage devices to a virtual volume, wherein the plurality of semiconductor storage devices include a plurality of types of semiconductor storage devices having a different upper limit number of writes and a storage capacity per cell, and a semiconductor storage device with a large storage capacity per cell has a small upper limit number of writes, and a low cost per storage capacity;

recording a write frequency for each storage area of the virtual volume;

changing the type of the semiconductor storage device to be allocated to a storage area based on the write frequency of the storage area of the virtual volume by:

allocating a storage area with a high write frequency to a semiconductor storage device of a type with a large upper limit number of writes; and allocating a storage area with a low write frequency to a semiconductor storage device of a type with a small upper limit number of writes, and calculating information for each recommended type of the storage capacity for the semiconductor storage device being the basis of the pool allocated to the storage areas based on:

the capacity of the pool or the virtual volume;

the assumed write frequency to the pool or the virtual volume; and the permissible write frequency for each type of the semiconductor storage device per unit capacity.

* * * * *